US00RE40679E

(19) United States
(12) Reissued Patent
Oda

(10) Patent Number: US RE40,679 E
(45) Date of Reissued Patent: Mar. 24, 2009

(54) PICTURE ENCODING METHOD, PICTURE ENCODING APPARATUS AND PICTURE RECORDING MEDIUM

(75) Inventor: Tsuyoshi Oda, Chiba (JP)

(73) Assignee: Sony Corporation, Tokyo (JP)

(21) Appl. No.: 09/474,479

(22) Filed: Dec. 29, 1999

Related U.S. Patent Documents

Reissue of:
(64) Patent No.: 5,703,646
Issued: Dec. 30, 1997
Appl. No.: 08/770,593
Filed: Dec. 19, 1996

U.S. Applications:
(63) Continuation of application No. 08/351,262, filed as application No. PCT/JP94/00610 on Apr. 11, 1994, now abandoned.

(30) Foreign Application Priority Data

Apr. 9, 1993 (JP) ..... P5-105943

(51) Int. Cl.
*H04N 7/18* (2006.01)

(52) U.S. Cl. ..... 375/240.13; 375/240.04; 375/240.05; 375/240.06; 375/240.07; 375/240.03; 375/240.14; 375/240.18

(58) Field of Classification Search . 375/240.01–240.29
See application file for complete search history.

(56) References Cited

U.S. PATENT DOCUMENTS 5,038,209 A * 8/1991 Hang ..... 375/240.05
5,073,820 A 12/1991 Nakagawa et al.
5,136,377 A * 8/1992 Johnston et al. ..... 375/240.12
5,144,424 A 9/1992 Savatier
5,231,484 A * 7/1993 Gonzales et al. ..... 375/240.04

(Continued)

FOREIGN PATENT DOCUMENTS

EP 0 475 251 A2 * 3/1992
EP 0 493 130 7/1992

(Continued)

OTHER PUBLICATIONS

Grueneberg K etal: "Hardware Implementation of the Framestore and Data Rate Control for a Digital HDTV–VCR" Signal Processing of HDTV. Proceedings of the International Workshop on HDTV, vol. 4, Nov. 18, 1992, pp. 51–58, XP000199113.

(Continued)

*Primary Examiner*—Andy Rao
(74) *Attorney, Agent, or Firm*—Frommer Lawrence & Haug LLP; William S. Frommer; Thomas F. Presson

(57) ABSTRACT

This invention employs a scheme to allow an input video signal to undergo encoding, e.g., predictive encoding, DCT processing, quantization at fixed quantization step size and variable length encoding to generate first encoded data to determine (calculate) allocated code quantity every frame or every GOP on the basis of data quantity every predetermined time, e.g., every frame or every GOP of the first encoded data and total quantity of usable data to encode the input video signal every predetermined time on the basis of the allocated code quantity to generate second encoded data. Thus, variable rate encoding such that encoding rate changes every predetermined time is realized. As a result, even if pictures (frames) of complicated are successive, there is no possibility that quantization step size is caused to be large with respect to these pictures as in the conventional apparatus. Thus, uniform high picture quality can be obtained through the entirety. Further, since second encoded data obtained in a manner as described above has variable rate, in the case where such encoded data is recorded onto picture recording media, limited memory capacity can be effectively used, and recording time of picture recording media can be prolonged. In addition, picture data of high picture quality uniform over the entirety can be reproduced from the picture recording media.

22 Claims, 12 Drawing Sheets

U.S. PATENT DOCUMENTS

| | | | | | |
|---|---|---|---|---|---|
| 5,287,200 | A | * | 2/1994 | Sullivan et al. | 382/251 |
| 5,379,355 | A | * | 1/1995 | Allen | 382/238 |
| 5,396,567 | A | * | 3/1995 | Jass | 382/251 |
| 5,404,168 | A | * | 4/1995 | Yamada et al. | 375/240.03 |
| 5,410,351 | A | * | 4/1995 | Kojima | 375/240.12 |
| 5,426,463 | A | * | 6/1995 | Reininger et al. | 375/240.03 |
| 5,434,623 | A | * | 7/1995 | Coleman et al. | 375/240.04 |
| 5,461,422 | A | * | 10/1995 | Hsieh | 375/240.03 |
| 5,719,986 | A | * | 2/1998 | Kato et al. | 386/109 |

FOREIGN PATENT DOCUMENTS

| | | | |
|---|---|---|---|
| EP | A-0493130 | * | 7/1992 |
| EP | A-0509576 | * | 10/1992 |
| EP | A-05009576 | * | 10/1992 |
| EP | 0 520 789 | | 12/1992 |
| EP | A-0535960 | * | 4/1993 |
| EP | 0 613 306 | | 8/1994 |

OTHER PUBLICATIONS

Viscito E et al: "A Video Compression Algorithm With Adaptive Bit Allocation and Quantization" Visual Communication and Image Processing '91: Visual Communication, Boston, Nov. 11–13, 1991, vol. Part 1, No. vol. 1605, Nov. 11, 1991, pp. 58–72, XP000479218 Kou–Hu Tzou; Toshio Koga.

Netra Vali A et al: "The Digital Spectrum–Compatible HDTV System" Signal Processing, Image Communication, Elsevier Science Publishers, Amsterdam, NL, vol. 4, No. 4 / 5, Aug. 1, 1992, pp. 293–305, XP000293750 ISSN: 0923–5965.

Abbas Razavi et al: "VLSI Implementation of an Image Compression Algorithm With a New Bit Rate Control Capability" Digital Signal Processing 2, Estimation, VLSI, San Francisco, Mar. 23–26, 1992, vol. 5, No. Conf. 17, Mar. 23, 1992, pp. 669–672, XP000341509 Institute of Electrical and Electronics Engineers.

Wen–Hsiung Chen et al: "Adaptive coding of monochrome and color images" IEEE Transactions on Communications, Nov. 1977, USA, vol. COM–25, No. 11, 1977, pp. 1285–1292, XP002085968 ISSN: 0090–6778.

Cheng–Tie Chen et al: "Hybrid Extended MPEG Video Coding Algorithm for General Video Applications" Signal Processing. Image Communication, Elsevier Science Publishers, Amsterdam, NL, vol. 5, No. 1 / 2, Feb. 1, 1993, pp. 21–37, XP000345611 ISSN: 0923–5965.

Proceedings of the Picture Coding Symposium (PCS), Lausanne, Mar. 17–19, 1993, No., Mar. 17, 1993 Swiss Federal Institute of Technology, pp. 19.3/A–19.3/B, XP 000346426 Nicoulin A. et al 'Feed–Back Free Rate Control for Digital Video Coding' * p. 19.3.A, right column, last paragraph –p. 19.3.B. left column, paragraph 1*.*

* cited by examiner

FIG.10C
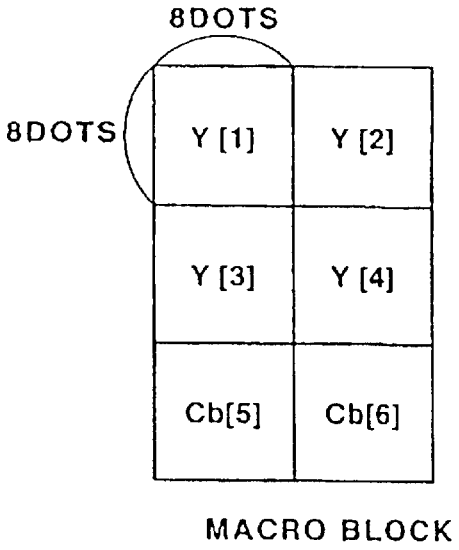
FIG.10A
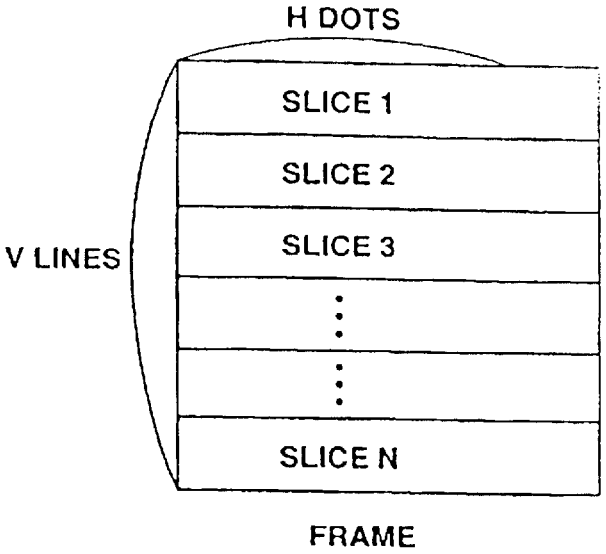
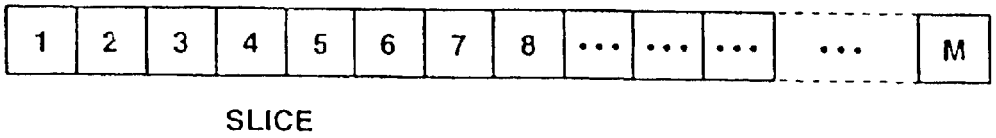
FIG.10B

PICTURE ENCODING METHOD, PICTURE ENCODING APPARATUS AND PICTURE RECORDING MEDIUM

Matter enclosed in heavy brackets [ ] appears in the original patent but forms no part of this reissue specification; matter printed in italics indicates the additions made by reissue.

This application is a continuation of application Ser. No. 08/351,262, filed as PCT/JP94/00610 Apr. 11, 1994 published as WO94/24822 Oct. 27, 1994, now abandoned.

TECHNICAL FIELD

This invention relates to a picture encoding method, a picture encoding apparatus and a picture recording medium, and more particularly to a picture encoding method, a picture encoding apparatus and a picture recording medium which are used in a system for implementing encoding for storage to a video signal of moving picture to record the coded signal onto a picture recording medium such as an optical disc, a magnetic disc, or a magnetic tape, etc., or a system for transmitting a video signal of moving picture through a transmission path.

BACKGROUND ART

Hitherto, in a system for transmitting a video signal of moving picture to remote place, for example, as in the television conference system, the television telephone system, etc., or a system for recording a video signal of moving picture onto a picture recording medium such as an optical disc, a magnetic disc or a magnetic tape, etc., or reproducing a recorded video signal of moving picture, there is adopted for the purpose of efficiently utilizing transmission path (or picture recording medium), a scheme to implement so called efficient encoding to a video signal by making use of correlation between lines or correlation between frames that video signal has to reduce redundancies in the spatial axis direction and the time axis direction to transmit only significant information, thus to improve transmission efficiency.

For example, in encoding processing in the spatial axis direction (hereinafter intra-frame coding processing), e.g., correlation between lines of a video signal is utilized as shown in FIG. 7A. In the case of attempting to transmit respective pictures PC1, PC2, PC3 . . . constituting a moving picture at times t1, t2, t3 . . . , picture data to be transmission processed is caused to undergo one-dimensional coding, e.g., within the same scanning line, or a picture is divided into, e.g., a plurality of blocks to allow picture data of respective blocks to undergo two-dimensional coding to thereby carry out data compression, thus to improve transmission efficiency.

Moreover, in coding processing in the time axis direction (hereinafter referred to as inter-frame coding processing), inter-frame correlation of video signal is utilized to determine, by so called predictive coding, for example, picture data PC12, PC23 . . . comprised of deficiencies (so called predictive errors) of picture data every corresponding pixels between adjacent pictures PC1 and PC2, PC2 and PC3 . . . in succession to transmit these picture data PC12, PC23, . . . to thereby carry out data compression, thus to improve transmission efficiency.

Thus, as compared to the case where all picture data of pictures PC1, PC2, PC3 . . . are transmitted, a video signal can be transmitted by extremely lesser data quantity.

Further, in the predictive coding in the above-described inter-frame coding processing, motion compensated prediction is used, e.g., in macro block units in order to further improve efficiency. Namely, e.g., in the case where a person at the central portion of picture moves, or the like, motion (movement) of an object moving in the picture is detected to correct position of picture data used for prediction in the former picture by that motion to carry out predictive coding, thereby making it possible to improve coding efficiency. However, even when such motion compensated prediction is employed, many data must be transmitted with respect to the portion where an object moves and appears from behind. In view of this, not only motion compensation in the above-described forward direction, but also motion compensation in backward direction or in both directions of forward and backward directions are carried out in combination, thereby making it possible to further improve coding efficiency.

In actual terms, as shown in FIG. 8A, in macro blocks of frame data F0, F1, F2, F3 of the 0th, first, second, third . . . frames of a video signal of moving picture to be transmitted, in the case where there took place changes of pictures as respectively indicated by motion vectors x0, x1, x2, x3 . . . between frames in succession, device on the transmitter side designates frames at intervals of a predetermined number of frames (e.g., every other frame), i.e., second, fourth . . . frames as interpolation frames to implement so called predetermined interpolation frame processing to these interpolation frames as shown in FIG. 8B to thereby generate transmit interpolated frame data F2X, F4X . . . . Further, with respect to non-interpolation frames, the device on the transmitting side implements a predetermined coding processing to frame data F1, F3 . . . to generate transmit non-interpolated frame data F1X, F3X . . . .

For example, difference SP2 (predictive error) between motion compensated frame data F3 and F2, difference SP3 between motion compensated frame data F1 and F2, and difference between frame data obtained by implementing interpolation processing to motion compensated frame data F1, F3 and frame data F2 are respectively determined in macro block units to compare difference (data) SP1 of frame data F2 and those differences. Then, data having minimum data quantity generated of those data SP1~SP4 is caused to be transmit interpolated data F2X in macro block units. Similarly, transmit interpolated F4X . . . with respect to respective interpolation frames are generated. Further, e.g., DCT processing and variable length coding processing, etc. are implemented to frame data F1, F3 . . . of non-interpolation frames to generate transmit non-interpolated frame data F1X, F3X . . . .

The transmit non-interpolated frame data F1X, F3X . . . and transmit interpolated frame data F2X, F4X . . . are transmitted to the device on the receiving side as transmit data along with motion vectors x0, x1, x3 . . . .

On the other hand, the device on the receiving side implements decoding processing corresponding to coding processing on the transmitting side to transmit data (transmit non-interpolated frame data F1X, F3X . . . , transmit interpolated frame data F2X, F4X . . . , data of motion vectors x0, x1, x3 . . . ), thus to reproduce frame data F0, F1, F2, F3 . . . . As a result, motion compensation is implemented not only in forward direction but also in backward direction or in forward and backward directions, thereby making it possible to further improve coding efficiency.

Picture encoding apparatus and picture decoding apparatus having the above-described function will now be described.

This picture encoding apparatus comprises, as shown in FIG. 9, a pre-processing circuit 61 for separating an input video signal VD into luminance signal and color difference signal, analog/digital (hereinafter referred to as A/D) converting circuits 62a, 62b for respectively converting the luminance signal and the color difference signal from the pre-processing circuit 61 into digital signals, a frame memory group 63 for storing luminance data and color difference data (hereinafter referred to as picture data) from the A/D converting circuits 62a, 62b, a format converting circuit 64 for reading out picture data from the frame memory group 63 in accordance with block format, and an encoder 65 for implementing efficient coding to picture data of block from the format converting circuit 64.

In operation, pro-processing circuit 61 separates input video signal VD into luminance signal and color difference signal. A/D converting circuits 62a, 62b respectively converts luminance signal and color difference signal into luminance data and color difference data each comprised of 8 bits. Frame memory group 63 stores these luminance and color difference data.

Format converting circuit 64 reads out, in accordance with block format, picture data (luminance data, color difference data) stored in the frame memory group 63. Encoder 65 encodes the picture data thus read out by a predetermined efficienct coding to output bit stream.

This bit stream is delivered to picture decoding apparatus 80 through transmission media 70 comprised of transmission path or picture recording media such as, optical disc, magnetic disc or magnetic tape, etc.

This picture encoding apparatus 80 comprises, as shown in the FIG. 9 mentioned above, decoder 81 corresponding to the encoder 65, format converting circuit 82 for converting picture data reproduced by the decoder 81 into frame format, frame memory groups 83 for storing picture data from the format converting circuit 82, D/A converting circuits 84a, 84b for converting luminance data, color difference data which have been read out from the frame memory group 83 into analog signals, and post-processing circuit 85 for mixing luminance signal, color difference signal from the D/A converting circuits 84a, 84b, thus to generate output video signal.

Decoder 81 decodes bit stream by decoding corresponding to efficienct coding of encoder 65 to reproduce picture data of block format. Format converting circuit 82 converts this picture data into frame format to store it into frame memory group 83.

D/A converting circuits 84a, 84b respectively convert luminance data and color difference data which have been read out from frame memory group 83 into luminance signal and color difference signal. Post-processing circuit 81 mixes these luminance signal and color difference signal, thus to generate output video signal.

In actual terms, pre-processing circuit 61 and A/D converting circuits 62a, 62b convert luminance signal and color difference signal into digital signal as described above to reduce quantity of data so that the numbers of pixels become equal to one half of those of luminance signal in upper and lower directions and in left and right directions with respect to the luminance signal thereafter to implement time axis multiplexing processing thereto to deliver luminance data and color difference data thus obtained to frame memory group 63.

From frame memory group 63, luminance data and color difference data are read out in accordance with block format as described above. Namely, e.g., picture data of one frame is divided into N slices as shown in FIG. 10A. Each slice is caused to include M macro blocks as shown in FIG. 10B. Each macro block is composed of luminance data Y1, Y2, Y3, Y4 of four luminance blocks consisting of 8×8 pixels adjacent in upper and lower directions and in left and right directions and color difference data Cb, Cr of color blocks consisting of 8×8 pixels in a range corresponding to these four luminance blocks. From frame memory group 63, luminance data and color difference data are read out so that picture data are successive in macro block units within slice and are successive in order of Y1, Y2, Y3, Y4, Cb, Cr within macro block. Picture data which have been read out in accordance with block format in this way are delivered to encoder 65.

Encoder 65 comprises motion vector detecting circuit 101 as shown in FIG. 11. This motion vector detecting circuit 101 detects, in macro block units, motion vector of picture data delivered thereto in accordance with block format. Namely, motion vector detecting circuit 101 detects, in macro block units, motion vector of current reference picture by forward original picture and/or backward original picture stored in frame memory group 83. Here, detection of motion vector is carried out such that minimum one of absolute value sums of differences between frames in macro block units is caused to be corresponding motion vector. The motion vector thus detected is delivered to motion compensating circuit 113, etc., and intra-frame differences in macro block units are delivered to intra-frame/forward/backward bidirectionally predictive judging circuit 103.

This intra-frame/forward/backward/bidirectionally predictive judging circuit 103 determines predictive mode of reference block on the basis of this value to control predictive coating circuit 104 so as to carry out switching of intra-frame/forward/backward/bidirectional prediction in macro block units. Predictive coding circuit 104 comprises adding circuits 104a, 104b, 104c and selecting (changeover) switch 104d, and is operative so that when predictive coding mode is intra-frame coding mode, it selects input picture itself, and when predictive coding mode is forward/backward/bidirectionally predictive mode, it selects differences (hereinafter referred to as difference data) every pixels of input picture data with respect to respective predictive pictures, thus to deliver the selected data to DCT circuit 105.

DCT circuit 105 implements DCT processing to input picture data or difference data in block units by making use of the two-dimensional correlation of video signal to deliver coefficient data thus obtained to quantizing circuit 106.

The quantizing circuit 108 quantizes coefficient data by using quantization step size (quantization scale) determined every macro block or slice to deliver quantized data thus obtained to variable length coding (hereinafter referred to as VLC) circuit 107 and inverse quantizing circuit 10B. Meanwhile, quantization step size used for this quantization is determined so as to take a value such that transmitting buffer memory 109 which will be described later does not break by providing feedback of buffer residual of transmitting buffer 109. This quantization step size is also delivered to VLC circuit 107 and inverse quantizing circuit 10B.

VLC circuit 107 implements variable length coding to quantized data along with quantization step size, predictive mode and motion vector to deliver them to transmitting buffer memory 109 as transmit data.

The transmitting buffer memory 109 temporarily stores transmit data thereafter to read out it at a predetermined bit rate to thereby smooth transmit data to output it as bit stream, and to feed quantization control signal in macro block units back to quantizing circuit 108 in accordance with residual data quantity remaining in the memory to control quantization step size. Thus, transmitting buffer memory 109 adjusts data quantity generated as bit stream to maintain data of appropriate residual (remaining capacity) (data quantity such that no overflow or underflow takes place) within the memory. For example, when data residual of transmitting buffer memory 109 increase to allowed upper limit, transmitting buffer memory 109 allows quantization step size of quantizing circuit 108 to be large by quantization control signal, thus to reduce data quantity of quantized data. On the other hand, when data residual of transmit buffer memory 109 decrease down to allowed lower limit, transmitting buffer memory 109 allows quantization step size of quantizing circuit 106 to be small by quantization control signal to thereby increase data quantity.

In this way, bit stream outputted from buffer memory 109 is delivered to picture decoded unit 80 through transmission media 70 comprised of a transmission path or a picture recording medium such as optical disc, magnetic disc, or magnetic tape etc. at a predetermined bit rate as described above.

On the other hand, inverse quantizing circuit 108 inverse-quantizes quantized data delivered from quantizing circuit 106 to reproduce coefficient data (quantization distortion is added) corresponding to output of the above-described DCT circuit 105 to deliver the coefficient data to Inverse Discrete Cosine Transform (hereinafter referred to as IDCT) circuit 110.

The IDCT circuit 110 implements IDCT processing to the coefficient data to reproduce picture data corresponding to input picture data in the intra-frame coding mode, and to reproduce difference data corresponding to output of predictive coding circuit 104 in the forward/backward/bidirectionally predictive modes, thus to deliver it to adding circuit 111.

When predictive coding mode is the forward/backward/bidirectionally predictive modes, the adding circuit 111 is supplied with motion-compensated predictive picture data from motion compensating circuit 113 which will be described later to add the motion-compensated predictive picture data and difference data to thereby reproduce picture data corresponding to input picture data.

The picture data reproduced in this way is stored into frame memory 112. Namely, inverse quantizing circuit 108~adding circuit 111 constitute a local decoding circuit to locally decode quantized data outputted from quantizing circuit 106 to write decoded picture thus obtained into frame memory 112 as forward predictive picture or backward predictive picture. The frame memory 112 is comprised of a plurality of frame memories. Bank switching of the frame memory is carried out. In correspondence with picture to be encoded, single frame is outputted as forward predictive picture data, or is outputted as backward predictive picture data. Moreover, in the case of bidirectional prediction, forward predictive picture data and backward predictive picture data are, e.g., averaged. The averaged data thus obtained is outputted. These predictive picture data are entirely the same pictures as pictures reproduced by decoder 81 which will be described later. Picture to be processed next is caused to undergo forward/backward/bidirectional predictive coding on the basis of this predictive picture.

Namely, picture data which has been read out from frame memory 112 is delivered to motion compensating circuit 113. This motion compensating circuit 113 implements motion compensation to predictive picture data on the basis of motion vector to deliver the motion-compensated predictive picture data to predictive encoding circuit 104 and adding circuit 111.

Decoder 81 will now be described.

To decoder 81, bit stream is inputted through transmission media 70 is inputted. This bit stream is inputted to Variable Length Decoding (Inverse Variable Length Coding) (hereinafter referred to as IVLC) through receiving buffer 201. The IVLC circuit 202 reproduces quantized data, motion vector, predictive mode and quantization step size, etc. from bit stream. These quantized data and quantization step size are delivered to inverse quantizing circuit 203. Motion vector is delivered to motion compensating circuit 207, and predictive mode is delivered to adding circuit 205.

The operation of inverse quantizing circuit 203~adding circuit 205 is the same as that of local decoding circuit of encoder 61, the operations of frame memory group 206, motion compensating circuit 207 are respectively the same as those of frame memory 112 and motion compensating circuit 113 of encoder 61. On the basis of quantized data, motion vector, predictive mode, quantization step size, decoding is carried out. As a result, reproduction picture data is outputted from adding circuit 205.

As described above, in the conventional apparatus, coding bit rate of bit stream generated at encoder 65 is caused to be fixed in correspondence with transfer rate of transmission media 70. Under this limitation, quantity of data generated, i.e., quantization step size of quantizing circuit 106 in encoder 65 was controlled. In other words, for example, a control was conducted such that when pictures of complicated pattern are successive, quantization step size is caused to be larger to suppress quantity of data generated, while when simple patterns are successive, quantization step size is caused to be smaller to increase quantity of data generated so that buffer memory 109 does not produce overflow or underflow, thus to maintain a fixed rate.

Accordingly, in the conventional apparatus, when complicated pictures are succesive, quantization step size is caused to be larger, so picture quality is deteriorated, while when simple pictures are successive, quantization step size is caused to be smaller. As a result, uniform picture quality cannot be obtained through the entirety.

In addition, in the case of recording bit stream onto a picture recording medium of a limited data capacity, in order to avoid extreme deterioration of picture quality with respect to pictures of complicated pattern, a fixed rate of high rate such that picture quality of such complicated picture is not injured must be applied to the entirety, resulting in decreased recording time.

DISCLOSURE OF THE INVENTION

In order to solve the above-described problem, a first picture encoding method according to this invention comprises the steps of encoding at least a portion of an input video signal to generate first encoded data, determining an encording rate every predetermined time on the basis of data quantity every predetermined time of the first encoded data and total quantity of usable data, and encoding the input video signal every predetermined time on the basis of the encoding rate to generate second encoded data.

A second picture encoding method according to this invention is characterized in that, in the first picture encoding method, at least a portion of the input video signal is quantized by a fixed quantization step size to generate the first encoded data.

A third picture encoding method according to this invention is characterized in that, in the first picture encoding method, the total quantity of usable data is proportionally allocated in accordance with data quantity every predetermined time, thus to determine the encoding rate every predetermined time.

A fourth picture encoding method according to this invention comprises the steps of implementing a predetermined predictive encoding or a predetermined transform encoding to at least a portion of an input video signal to generate first coefficient data, quantizing the first coefficient data by a fixed step size to generate first quantized data, allowing the first quantized data to undergo variable length encoding to generate a first bit stream, determining an encoding rate every predetermined time on the basis of data quantity of the first bit stream and total quantity of usable data, implementing the predetermined predictive encoding and/or the predetermined transform encoding to the input video signal to generate second coefficient data, quantizing the second coefficient data by a quantization step size based on the encoding rate every predetermined time to generate second quantized data, and allowing the second quantized data to undergo variable length encoding to generate a second bit stream.

A fifth picture encoding method according to this invention is characterized in that, in the fourth picture encoding method, the encoding rate is determined every one frame on the basis of data quantity every one frame in the first bit stream and total quantity of usable data.

A sixth picture encoding method according to this invention is characterized in that, in the fourth picture-encoding method, the encoding rate is determined every GOP on the basis of data quantity of at least a potion every GOP consisting of a plurality of frames in the first bit stream and total quantity of usable data.

A seventh picture encoding method according to this invention is characterized in that, in the sixth picture encoding method, encoding rate every GOP is determined on the basis of quantity with respect to intra-frame encoded picture and forward predictive encoded picture in the GOP.

An eighth picture encoding method according to this invention is characterized in that, in the fourth picture encoding method, the total quantity of usable data is proportionally allocated in dependency upon data quantity of the first bit stream every predetermined time to determine an encoding rate every predetermined time.

A ninth picture encoding method according to this invention comprises the steps of determining difficulty of encoding every predetermined picture unit of an input video signal, setting an encoding rate every predetermined picture unit on the basis of the difficulty of encoding and total quantity of usable data, and implementing encoding to the input video signal so that encoding rates of respective picture units are in correspondence with the set encoding rate every picture unit.

A tenth picture encoding method according to this invention is characterized in that, in the ninth picture encoding method, the predetermined picture unit is frame.

An eleventh picture encoding method according to this invention is characterized in that, in the ninth picture encoding method, the predetermined picture unit is GOP consisting of a plurality of frames.

A twelfth picture encoding method according to this invention is characterized in that, in the ninth picture encoding method, a predetermined predictive encoding and/or a predetermined transform encoding is implemented to at least a portion of the input video signal to generate coefficient data to quantize the coefficient data by a fixed quantization step size to thereby determine difficulty of encoding.

A first picture encoding apparatus according to this invention comprises first encoding means for encoding at least a portion of an input video signal to generate first encoded data; encoding control means for determining an encoding rate every predetermined time on the basis of data quantity every predetermined time of the first encoded data from the first encoding means and total quantity of usable data; and second encoding means for encoding the input video signal every predetermined time on the basis of the encoding rate every predetermined time from encoding control means to generate second encoded data.

A second picture encoding apparatus according to this invention is characterized in that, in the first picture encoding apparatus, the first encoding means comprises quantizing means for quantizing at least a portion of the input video signal by a fixed quantization step size.

A third picture encoding apparatus according to this invention is characterized in that, in the first picture encoding apparatus, the encoding control means is operative to proportionally allocate the total quantity of usable data in dependency upon data quantity every predetermined time, thus to determine an encoding rate every predetermined time.

A fourth picture encoding apparatus according to this invention comprises first encoding means for implementing a predetermined predictive encoding and/or a predetermined transform encoding to at least a portion of an input video signal to generate first coefficient data; first quantizing means for quantizing the first coefficient data from the first encoding means by a fixed quantization step size to generate first quantized data; first variable length encoding means for allowing the quantized data from the first quantizing means to undergo variable length encoding to generate a first bit stream; encoding control means for determining an encoding rate every predetermined time on the basis of data quantity of the first bit stream from the first variable length encoding means and total quantity of usable data; second encoding means for implementing the predetermined predictive encoding and/or the predictive transform encoding to the input video signal to generate second coefficient data; second quantizing means for quantizing the second coefficient data from the second encoding means by a quantization step size based on the encoding rate every predetermined time from the encoding control means to generate second quantized data; and second variable length encoding means for allowing the second quantized data from the second quantizing means to undergo variable length encoding to generate a second bit stream.

A fifth picture encoding apparatus according to this invention is characterized in that, in the fourth picture encoding apparatus, the encoding control means determines the encoding rate every one frame on the basis to data quantity every one frame in the first bit stream and total quantity of usable data.

A sixth picture encoding apparatus according to this invention is characterized in that, in the fourth picture encoding apparatus, the encoding control means determines the encoding rate every GOP on the basis of data quantity of at least a portion every GOP consisting of a plurality of frames in the first bit stream and total quantity of usable data.

A seventh picture encoding apparatus according to this invention is characterized in that, in the sixth picture encoding apparatus, the encoding control means determines an encoding rate every GOP on the basis of data quantity with respect to intra-frame encoded picture and forward predictive encoded picture in the GOP.

An eighth picture encoding apparatus according to this invention is characterized in that, in the fourth picture encoding apparatus, the encoding control means proportionally allocate the total quantity of usable data in dependency upon data quantity of the first bit stream every predetermined time, thus to determine the encoding rate every predetermined time.

A ninth picture encoding apparatus according to this invention comprises difficulty calculating means for calculating (determining) difficult of encoding every predetermined picture unit of an input video signal; encoding rate setting means for setting an encoding rate every predetermined picture unit on the basis of the difficulty of encoding from the difficulty calculating means and total quantity of usable data; and encoding means for allowing the input video signal to undergo encoding so that encoding rates of respective picture units are in correspondence with the encoding rate every picture unit set by the encoding rate setting means.

A tenth picture encoding apparatus according to this invention is characterized in that, in the ninth picture encoding apparatus, the difficulty calculating means determines difficulty of encoding every frame.

An eleventh picture encoding apparatus according to this invention is characterized in that, in the ninth picture encoding apparatus, the difficulty calculating means determines difficulty of encoding every GOP consisting of a plurality of frames.

A twelfth picture encoding apparatus according to this invention is characterized in that, in the ninth picture encoding apparatus, the difficulty calculating means implements a predetermined predictive encoding and/or a predetermined transform encoding to at least a portion of the input video signal to generate coefficient data, and to quantize the coefficient data by a fixed step size to thereby calculate (determine) difficulty of encoding.

A first picture recording medium according to this invention is characterized in that there is recorded a second bit stream obtained by encoding at least a portion of an input video signal to generate first encoded data to determine an encoding rate every predetermined time on the basis of data quantity every predetermined time of the first encoded data and total quantity of usable data to encode the input video signal every predetermined time on the basis of the encoding rate.

A second picture recording medium according to this invention is characterized in that there is recorded a second bit stream obtained by implementing a predetermined predictive encoding and/or a predetermined transform encoding to at least a portion of an input video signal to generate first coefficient data to quantize the first coefficient data by a fixed quantization step size to generate first quantized data to allow the first quantized data to undergo variable length encoding to generate a first bit stream to determine an encoding rate every predetermined time on the basis of data quantity of the first bit stream and total quantity of usable data to implement the predetermined predictive encoding and/or the predetermined transform encoding to the input video signal to generate second coefficient data to quantize the second coefficient data by a quantization step size based on the encoding rate every predetermined time to generate second quantized data to allow the second quantized data to undergo variable length encoding.

A third picture recording medium according to this invention is characterized in that there is recorded encoded data obtained by determining difficulty of encoding every predetermined picture unit of an input video signal to set encoding rate every predetermined picture unit on the basis of the difficulty of encoding and total quantity of usable data to encode the input video signal so that encoding rates of respective picture units are in correspondence with the set encoding rate every picture unit.

In accordance with the first picture encoding method according to this invention, encoding rate every predetermined time is determined on the basis of data quantity every predetermined time of first encoded data obtained by encoding at least a portion of an input video signal and total quantity of usable data to encode the input video signal every predetermined time on the basis of the encoded rate to generate second encoded data.

In accordance with the second picture encoding method according to this invention, in the first picture encoding method, at least a portion of input video signal is quantized by fixed quantization step size to thereby generate the first encoded data to determine the encoding rate to encode the input video signal every predetermined time on the basis of the encoding rate to generate second encoded data.

In accordance with the third picture encoding method according to this invention, in the first picture encoding method, the total quantity of usable data is proportionally allocated in dependency upon data quantity every predetermined time to determine encoding rate every predetermined time to encode the input video signal every predetermined time on the basis of the encoding rate to generate second encoded data.

In accordance with the fourth picture encoding method according to this invention, predetermined predictive encoding and/or predetermined transform encoding processing, and quantization processing and variable length encoding processing at fixed quantization step size are implemented to at least a portion of an input video signal to generate first bit stream to determine encoding rate every predetermined time on the basis of data quantity of the first bit stream and total quantity of usable data. Then, predetermined predictive encoding and/or predetermined transform encoding processing, and quantization processing and variable length encoding processing by quantization step size based on encoding rate every predetermined time are implemented to input video signal, thus to generate second bit stream.

In accordance with the fifth picture encoding method according to this invention, in the fourth picture encoding method, the encoding rate is determined every one frame on the basis of data quantity every one frame in the first bit stream and total quantity of usable data. Then, predetermined predictive encoding and/or predetermined transform encoding processing, and quantization processing and variable length encoding processing at quantization step size based on encoding rate every one frame are implemented to input video signal, thus to generate second bit stream.

In accordance with the sixth picture encoding method according to this invention, in the fourth picture encoding method, the encoding rate is determined every GOP on the basis of data quantity of at least a portion every GOP consisting of a plurality of frames in the first bit stream and total quantity of usable data. Then, predetermined predictive encoding and/or predetermined transform encoding processing, and quantization processing and variable length encoding processing at quantization step size based on encoding rate every GOP are implemented to input video signal, thus to generate second bit stream.

In accordance with the seventh picture encoding method according to this invention, in the sixth picture encoding method, encoding rate every GOP is determined on the basis of data quantity with respect to intra-frame encoded picture and forward predictive encoded picture in the GOP. Then, predetermined predictive encoding and/or predetermined transform encoding processing, quantization processing at quantization step based on encoding rate every GOP and variable length encoding processing are implemented to input video signal, thus to generate second bit stream.

In accordance with the eighth encoding method according to this invention, in the fourth picture encoding method, the total quantity of usable data is proportionally allocated in dependency upon data quantity of the first bit stream every predetermined time to determine the encoding rate every predetermined time. Then, predetermined predictive encoding and/or predetermined transform encoding processing, quantization processing at quantization step size based on encoding rate every predetermined time and variable length encoding processing are implemented to input video signal, thus to generate second bit stream.

In accordance with the ninth picture encoding method according to this invention, difficulty of encoding every predetermined picture unit of input video signal is determined to set encoding rate every predetermined picture unit on the basis of the difficulty of encoding and total quantity of usable data. Then, the input video signal is encoded so that the encoding rates of respective picture units are in correspondence with the set encoding rate every picture unit.

In accordance with the tenth picture encoding method according to this invention, in the ninth picture encoding method, difficulty of encoding is determined every frame of input video signal to determine the encoding rate every frame. Then, the input video signal is encoded so that encoding rates of respective frames are in correspondence with the set encoding rate every frame.

In accordance with the eleventh picture encoding method, in the ninth picture encoding method, difficulty of encoding is determined every GOP of input video signal to determine the encoding rate every GOP. Then, the input video signal is encoded so that encoding rates of GOPs are in correspondence with the set encoding rate every GOP.

In accordance with the twelfth encoding method according to this invention, in the ninth picture encoding method, coefficient data obtained by implementing predetermined predictive encoding and/or predetermined transform encoding to at least a portion of input video signal is quantized at fixed quantization step size to thereby determine difficulty. Then, the input video signal is encoded so that encoding rates of respective picture units are in correspondence with the set encoding rate every picture unit.

Further, in accordance with the first picture encoding apparatus according to this invention, encoding rate every predetermined time is determined on the basis of data quantity every predetermined time of first encoded data obtained by encoding at least a portion of input video signal and total quantity of usable data to encode the input video signal every predetermined time on the basis of the encoding rate, thus to generate second encoded data.

In accordance with the second picture encoding apparatus according to this invention, in the first picture encoding apparatus, at least a portion of input video signal is quantized at fixed quantization step size to thereby generate the first encoded data to determine the encoding rate to encode the input video signal every predetermined time on the basis of the encoding rate, thus to generate second encoded data.

In accordance with the third picture encoding apparatus according to this invention, in the first picture encoding apparatus, the total quantity of usable data is proportionally allocated in dependency upon the data quantity every predetermined time to determine the encoding rate every predetermined time to encode the input video signal every predetermined time on the basis of the encoding rate, thus to generate second encoded data.

In accordance with the fourth picture encoding apparatus according to this invention, predetermined predictive encoding and/or predetermined transform encoding processing, and quantization processing at fixed quantization step size and variable length encoding processing are implemented to at least a portion of input video signal to generate first bit stream to determine encoding rate every predetermined time on the basis of data quantity of the first bit stream and total quantity of usable data. Then, predetermined predictive encoding and/or predetermined transform encoding processing, and quantization processing and variable length encoding processing at quantization step size based on encoding rate every predetermined time, thus to generate second bit stream.

In accordance with the fifth picture encoding apparatus according to this invention, in the fourth picture encoding apparatus, the encoding rate is determined every one frame on the basis of data quantity every one frame in the first bit stream and total quantity of usable data. Then, predetermined predictive encoding and/or predictive transform processing, and quantization processing at quantization step size based on encoding rate every one frame and variable length encoding processing are implemented to input video signal, thus to generate second bit stream.

In accordance with the sixth picture encoding apparatus according to this invention, in the fourth picture encoding apparatus, the encoding rate is determined every GOP on the basis of data quantity of at least a portion every GOP consisting of a plurality of frames in the first bit stream and total quantity of usable data. Then, predetermined predictive encoding and/or predetermined transform encoding processing, quantization processing at quantization step size based on encoding rate every GOP and variable length encoding processing are implemented to input video signal to generate second bit stream.

In accordance with the seventh picture encoding apparatus according to this invention, in the sixth picture encoding apparatus, the encoding rate every GOP is determined on the basis of data quantity with respect to intra-frame encoded picture and forward predictive encoded picture in the GOP. Then, predetermined predictive encoding and/or predetermined transform encoding processing, quantization processing at quantization step size based on encoding rate every GOP and variable length encoding processing are implemented to input video signal, thus to generate second bit stream.

In accordance with the eighth picture encoding apparatus according to this invention, in the fourth picture encoding apparatus, the total quantity of usable data is proportionally allocated in dependency upon data quantity of the first bit stream every predetermined time to determine the encoding rate every predetermined time. Then, predetermined predictive encoding and/or predetermined transform encoding processing, quantization processing at quantization step size based on encoding rate every predetermined time and variable length encoding processing are implemented to input video signal, thus to generate second bit stream.

In accordance with the ninth picture encoding apparatus according to this invention, difficulty of encoding is determined every predetermined picture unit of input video signal to set encoding rate every predetermined picture unit on the basis of the difficulty of encoding and total quantity of usable data. Then, the input video signal is encoded so that encoding rates of respective picture units are in correspondence with the set encoding rate every picture unit.

In accordance with the tenth picture encoding apparatus according to this invention, in the ninth picture encoding apparatus, difficulty of encoding is determined every frame of input video signal to determine the encoding rate every frame. Then, the input video signal is encoded so that encoding rates of respective frames are in correspondence with the set encoding rate every frame.

In accordance with the eleventh picture encoding apparatus according to this invention, in the ninth picture encoding apparatus, difficulty of encoding is determined every GOP of input video signal to determine the encoding rate every GOP. Then, the input video signal is encoded so that encoding rates of respective GOPs are in correspondence with the set encoding rate every GOP.

In accordance with the twelfth picture encoding apparatus according to this invention, in the ninth picture encoding apparatus, coefficient data obtained by implementing predetermined predictive encoding and/or predetermined transform encoding to at least a portion of input video signal is quantized at fixed quantization step size to thereby the determine difficulty of encoding. Then, the input video signal is encoded so that encoding rates of respective picture units are in correspondence with the set encoding rate every picture unit.

In addition, in accordance with the first picture recording medium according to this invention, there is recorded second bit stream obtained by determining encoding rate every predetermined time on the basis of data quantity every predetermined time of first encoded data obtained by encoding at least a portion of input video signal and total quantity of usable data to encode the input video signal every predetermined time on the basis of the encoding rate.

In accordance with the second picture recording medium according to this invention, there is recorded second bit stream obtained by implementing predetermined predictive encoding and/or predetermined transform encoding processing, and quantization processing and variable length encoding processing at fixed quantization step size to generate first bit stream to determine encoding rate every predetermined time on the basis of data quantity of the first bit stream and total quantity of usable data to implement predetermined predictive encoding and/or predetermined transform encoding processing, and quantization processing and variable length encoding processing at quantization step size based on encoding rate every predetermined time to the input video signal.

In accordance with the third picture recording medium according to this invention, there is recorded encoded data obtained by determining difficulty of encoding every predetermined picture unit of input video signal to set encoding rate every predetermined picture unit on the basis of the difficulty of encoding and total quantity of usable data to encode the input video signal so that encoding rates of respective picture units are in correspondence with the set encoding rate every picture unit.

BRIEF DESCRIPTION OF THE DRAWINGS

FIG. 10 is a view showing the configuration of frame, macro block and slice.

BEST MODE FOR CARRYING OUT THE INVENTION

An embodiment of a picture encoding method, a picture encoding apparatus and a picture recording medium according to this invention will now be described with reference to the attached drawings.

Figure 1:
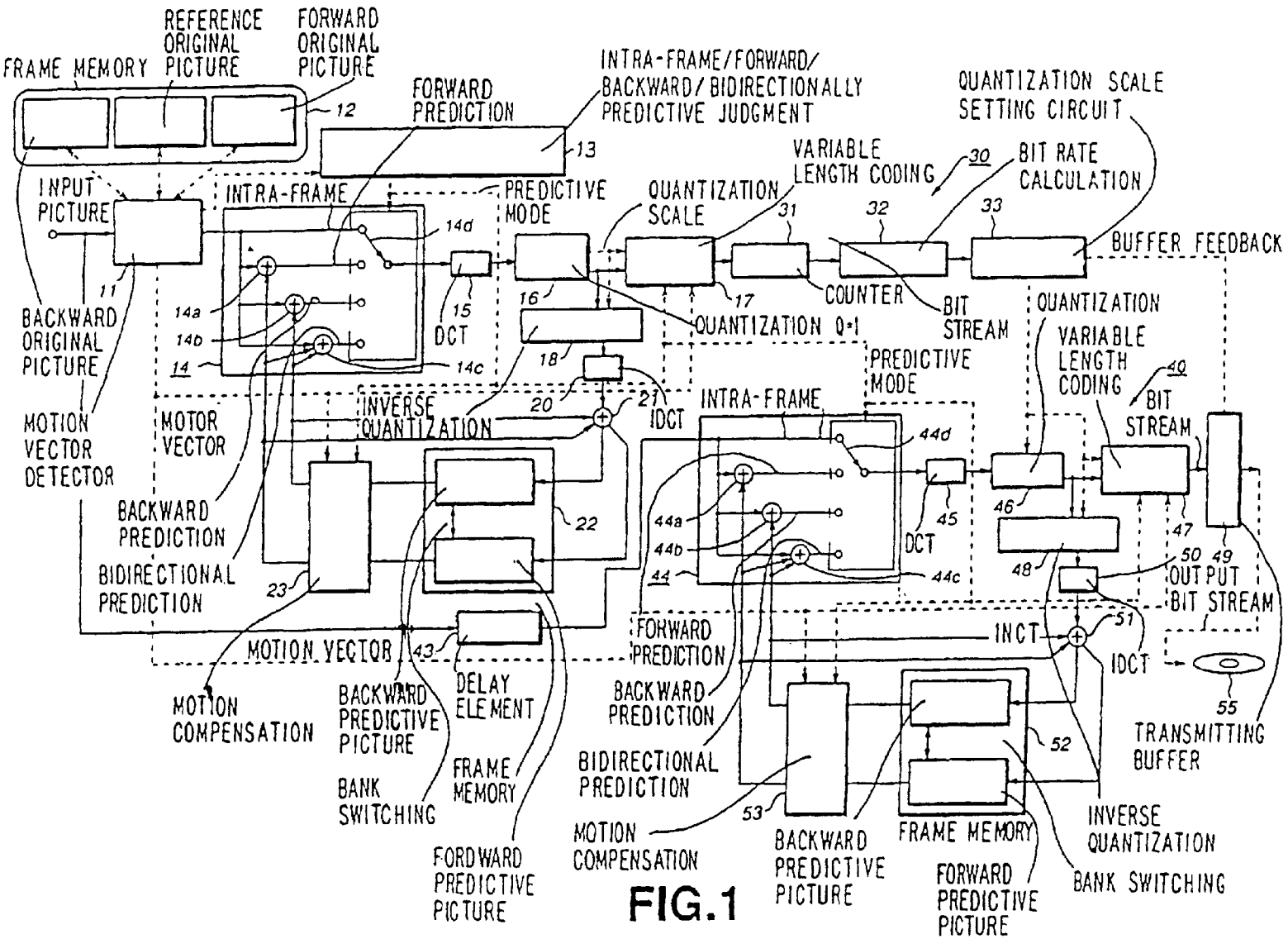
FIG. 1 is a block diagram showing a circuit configuration of the essential part of a picture encoding apparatus to which this invention is applied.

A picture encoding apparatus to which this invention is applied comprises, as shown in FIG. 1, for example, a first encoding circuit 10 for encoding an input video signal to generate first encoded data, an encoding control circuit 30 for determining encoding rate every predetermined time on the basis of data quantity every predetermined time of the first encoded data from the first encoding circuit 10 and total quantity of usable data, and a second encoding circuit 40 for encoding the input video signal every predetermined time on the basis of the encoding rate from the encoding control circuit 30 to generate second encoded data.

More particularly, the first encoding circuit 10 comprises, as shown in FIG. 1 mentioned above, a frame memory group 12 for storing input picture data which is input video signal, a motion vector detecting circuit 11 for detecting motion vector of input picture data from input picture data on the basis of picture data stored in the frame memory group 12, a frame memory 22 for storing predictive picture data, a motion compensating circuit 23 for implementing motion compensation to predictive picture data which has been read out from the frame memory 22 on the basis of motion vector from the motion vector detecting circuit 11, a predictive encoding circuit 14 for predictive-encoding input picture data on the basis of motion-compensated predictive picture data from the motion compensating circuit 23, a DCT circuit 15 for implementing encoding, e.g., Discrete Cosine Transform (hereinafter referred to as DCT) processing to differences, etc. which are predictive errors from the predictive encoding circuit 14 to generate coefficient data, a quantizing circuit 18 for quantizing coefficient data from the DCT circuit 15 at a fixed quantization step size to generate quantized data, a Variable Length Code (hereinafter referred to as VLC) circuit 17 for allowing quantized data from the quantizing circuit 18 to undergo variable length encoding to output variable length encoded data, an inverse quantizing circuit 18 for inverse-quantizing quantized data from the quantizing circuit 16 to reproduce coefficient data, an Inverse Discrete Cosine Transform (hereinafter referred to as IDCT) circuit 20 for implementing decoding e.g., IDCT processing to coefficient data from the inverse quantizing circuit 18, and an adding circuit 21 for adding difference from the IDCT circuit 20 and motion-compensated predictive picture data from the motion compensating circuit 23 to generate predictive picture data with respect to the next input picture data to deliver the predictive picture data to the frame memory 22.

Moreover, the second encoding circuit 40 comprises, as shown in FIG. 1 mentioned above, a delay element 43 for delaying input picture data, a frame memory 52 for storing predictive picture data, a motion compensating circuit 53 for implementing motion compensation to predictive picture data which has been read out from the frame memory 52 on the basis of motion vector from the motion vector detecting circuit 11, a predictive encoding circuit 44 for a predictive-encoding input picture data delayed at the delay element 43 on the basis of the motion compensated predictive picture data from the motion compensating circuit 53, a DCT circuit 45 for implementing encoding, e.g., DCT processing to difference, etc. from the predictive encoding circuit 44 to generate coefficient data, a quantization scale setting circuit 33 for setting quantization step size on the basis of encoding rate from the encoding control circuit 30, a quantizing circuit 46 for quantizing coefficient data from the DCT circuit 45 at quantization step size form the quantization scale setting circuit 33, a VLC circuit for allowing quantized data from the quantizing circuit 46 to undergo variable length encoding to output variable length encoded data, a transmitting buffer memory 49 for temporarily storing variable length encoded data from the VLC circuit 47 to output it at a fixed bit rate, an inverse quantizing circuit 48 for inverse-quantizing quantized data from the quantizing circuit 46 to reproduce coefficient data, an IDCT circuit 50 for implementing decoding, e.g., IDCT processing to the coefficient data from the inverse quantizing circuit 48 to reproduce the difference, and an adding circuit 51 for adding difference from the IDCT circuit 50 and the motion-compensated predictive picture data from the motion compensating circuit 53 to generate predictive picture data with respect to the next input picture data to deliver the predictive picture data to the frame memory 52.

In this picture encoding apparatus, by the first encoding circuit 10, encoding processing, e.g., predictive encoding processing, DCT processing, quantization processing at fixed quantization step size and variable length encoding processing are implemented to input picture data. By encoding control circuit 30, encoding bit rate is determined on the basis of data quantity every predetermined time of variable length encoded data which is the first bit stream obtained and data capacity of picture recording medium 55, e.g., comprised of optical disc, magnetic disc or magnetic tape, etc. or total quantity of usable data determined by bit rate of transmission path (transfer rate). Thereafter, by second encoding circuit 40, predictive encoding processing, DCT processing, quantization processing and variable length encoding processing are implemented to input picture data for a second time. In generating variable length encoded data which is second bit stream, quantization is made by quantization step size based on encoding bit rate.

Figure 2:
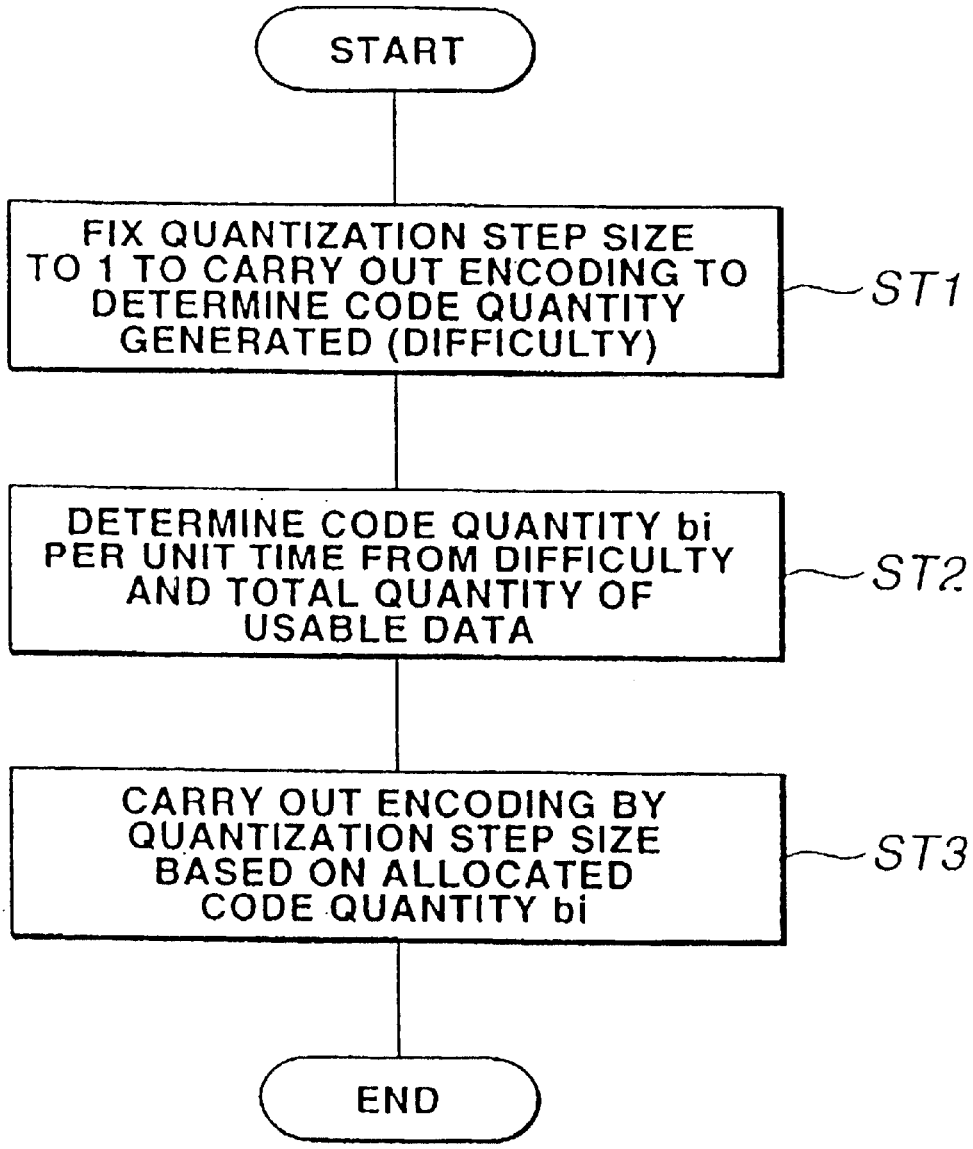
FIG. 2 is a flowchart for explaining the operation of first encoding circuit constituting the above-mentioned picture encoding apparatus.

Namely, in this picture encoding apparatus, as shown in FIG. 2, for example, at step ST1, quantizing circuit 16 of first encoding circuit 10 sets quantization step size to, e.g., 1 to quantize coefficient data delivered from DCT circuit 15 to generate quantized data. Counter 31 of encoding control circuit 30 counts data quantity of variable length encoded data (first bit stream) obtained by allowing the quantized data to undergo variable length encoding every predetermined time, e.g., one frame to determine, every frame, quantity of code generated indicating difficulty of encoding.

At step ST2, bit rate calculating circuit 32 determines allocated code quantity allocated every frame on the basis of difficulty (quantity of code generated) every frame and total quantity of usable data.

At step ST3, quantizing circuit 46 of second encoding circuit 40 quantizes coefficient data delivered from DCT circuit 45 by quantization step size based on allocated code quantity to generate quantized data.

In actual terms, inputted picture data is temporarily stored into frame memory group 12. From the frame memory group 12, that picture data is read out in accordance with block format as described in the prior art.

Motion vector detecting circuit 11 reads out memory picture data from frame memory group 12 in macro block units described above to detect motion vector. Namely, motion vector detecting circuit 11 detects, in macro block units, motion vector of current reference picture by using forward original picture and/or backward original picture stored in frame memory group 12. Here, detection of motion vector is carried out such that a motion vector in which, e.g., absolute value sum of differences between frames in macro block units becomes minimum is caused to be corresponding motion vector. The detected motion vector is delivered to motion compensating circuits 23, 53, etc., and absolute value sum of differences between frames in macro block units is delivered to intra-frame/forward/backward/bidirectionally predictive judging circuit 13.

The intra-frame/forward/backward/bidirectionally predictive judging circuit 13 determines predictive mode on the basis of the above value to control predictive encoding circuit 14 so as to carry out switching of intra-frame/forward/backward/bidirectional prediction in block units.

The predictive encoding circuit 14 comprises, as shown in FIG. 1 mentioned above, adding circuits 14a, 14b, 14c and selecting (changeover) switch 14d. When predictive encoding mode is intra-frame encoding mode, the selecting switch 14d select input picture data itself, and when predictive encoding mode is forward/backward/bidirectionally predictive mode, it selects differences (hereinafter referred to as difference data) every pixels of input picture data with respect to respective predictive pictures. Then, the selecting switch 14d delivers selected data to DCT circuit 15.

The DCT circuit 15 implements, in block units, DCT processing to input picture data or difference data delivered from selecting switch 14d by making use of the two-dimensional correlation of video signal to deliver coefficient data thus obtained to quantizing circuit 16.

The quantizing circuit 16 quantizes coefficient data delivered from DCT circuit 15 at a fixed quantization step size, e.g., with quantization step size being set to 1 to deliver quantized data thus obtained to VLC circuit 17 and inverse quantizing circuit 18.

The VLC circuit 17 carries out variable length encoding of quantized data along with quantization step size, predictive mode, and motion vector, etc. to deliver variable length encoded data obtained to encoding control circuit 30 as a first bit stream.

The encoding control circuit 30 comprises, as shown in the FIG. 1 mentioned above, counter 31 for counting data quantity every predetermined time of variable length encoded data from the VLC circuit 17, and bit rate calculating circuit 32 for calculating (determining) allocated code quantity per unit time on the basis of data quantity from the counter 31 and total quantity of usable data. The counter 31 counts data quantity of the first bit stream every predetermined time, e.g., every one frame to determine (calculates) difficulty every frame to deliver this difficulty to bit rate calculating circuit 32.

The bit rate calculating circuit 32 calculates (determines) allocated code quantity allocated every frame, i.e., mean encoding rate every frame time on the basis of difficulty every frame and total quantity of usable data, and delivers this allocated code quantity to quantization scale setting circuit 33 of second encoding circuit 40.

In actual terms, bit rate calculating circuit 32 performs the following calculation. Namely, assuming now that the number of all frames is N, total quantity of usable data is B, difficulty of the i (i=0, 1, 2, . . . N−1)-th frame is $d_i$, and allocated code quantity with respect to the i-th frame is $b_i$, when this allocated code quantity $b_i$ is caused to be proportional to difficulty $d_i$ as indicated by the following formula (1), data total quantity B can be calculated by adding allocated code quantities $b_i$ of all frames as indicated by the following formula (2). In the formula, a represents constant.

$$b_i = a \times d_i \tag{1}$$

$$B = \sum_{i=0}^{N-1} b_i = \sum_{i=0}^{N-1} a \times d_i = a \times \sum_{i=0}^{N-1} d_i \tag{2}$$

Accordingly, constant a can be calculated by the following formula (3). When substitution of this constant a into the formula (1) is made, allocated code quantity $b_i$ with respect to the i-th frame can be calculated by the following formula (4).

$$a = \frac{B}{\sum_{i=0}^{N-1} d_i} \tag{3}$$

$$b_i = d_i \times \left( \frac{B}{\sum_{i=0}^{N-1} d_i} \right) \tag{4}$$

Thus, bit rate calculating circuit 32 increases allocated code quantity $b_i$ with respect to frame of picture of complicated pattern, for example, and decreases allocated code quantity $b_i$ with respect to frame of simple pattern.

On the other hand, inverse quantizing circuit 18 inverse-quantizes quantized data delivered from quantizing circuit 16 at quantization step size caused to be set to 1 to reproduce coefficient data (quantization distortion is added) corresponding to output of DCT circuit 15 to deliver that coefficient data to IDCT circuit 20.

The IDCT circuit 20 implements IDCT processing to coefficient data to reproduce input picture data corresponding to output of predictive encoding circuit 14 in the intra-frame encoding mode, and reproduces difference data in the forward/backward/bidirectionally predictive mode, thus to deliver reproduced data to adding circuit 21.

The adding circuit 21 is supplied, when predictive encoding mode is forward/backward/bidirectionally predictive mode, with motion-compensated predictive picture data from motion compensating circuit 23. The adding circuit 21 adds this predictive picture data and difference data delivered from IDCT circuit 20 to thereby reproduce picture data corresponding to input picture data.

The picture data reproduced in this way is stored into frame memory 22 as predictive picture data. Namely, inverse quantizing circuit 18~adding circuit 21 constitute a local decoding circuit to locally decode quantized data outputted from quantizing circuit 18 on the basis of predictive mode to write decoded picture obtained into frame memory 22 as forward predictive picture or backward predictive picture. Frame memory 22 is composed of a plurality of frame memories. Back switching of frame memory is carried out. In dependency upon picture to be encoded, e.g., single frame is outputted as forward predictive picture data, or is outputted as backward predictive picture data. Further, in the case of forward/backward/bidirectional prediction, forward predictive picture data and backward predictive picture data are, e.g., averaged and the averaged data is outputted. These predictive picture data are entirely the same picture data as picture data reproduced by picture decoding apparatus which will be described later. Picture to be processed next is caused to undergo forward/backward/bidirectionally encoding on the basis of this predictive picture.

The operation of second encoding circuit 40 will now be described. It is to be noted that since circuits except for quantization scale setting circuit 33, delay element 43, quantizing circuit 48, and transmitting buffer 49 constituting second encoding circuit 40 perform the same operations as those of circuits constituting the above-described first encoding circuit 10, their explanation is omitted.

Delay element 43 delays input picture data, e.g., by time until encoding control signal is outputted from encoding control circuit 30. Then, at predictive encoding circuit 44 and DCT circuit 45, predictive encoding processing and DCT processing which are in accordance with predictive mode delivered from intra-frame/forward/backward/bidirectionally predictive judging circuit 13 are implemented to the delayed input picture data. Thus, coefficient data is generated.

Quantization scale setting circuit 33 determines (calculates) allocated code quantity every macro block (e.g., value obtained by dividing allocated code quantity every frame by the number of macro blocks in one frame) from delivered allocated code quantity every frame to carry out comparison between code quantity generated in a macro block which is detected from buffer feedback from transmitting buffer 49 and allocated code quantity every macro block. The quantization scale setting circuit 33 operates as follows so as to allow encoding bit rate of respective frames to become close to set mean encoding bit rate every frame time. Namely, in the case where code quantity generated in corresponding macro block is greater than allocated code quantity every macro block, the circuit 33 sets quantization step size of next macro block to a greater value in order to suppress code quantity generated by the next macro block. In contrast, in the case where code quantity generated in corresponding macro block is smaller than allocated code quantity every macro block, the circuit 33 sets quantization step size of next macro block to a smaller value so as to increase code quantity generated. It should be noted that quantization scale setting circuit 33 is operative so that in the case where buffer feedback from transmitting buffer 49 indicates that transmitting buffer 49 is in a state close to overflow state, it allows quantization step size to be larger to suppress overflow irrespective of comparison result between the allocated code quantity and code quantity generated, while in the case where buffer feedback from the transmitting buffer 49 indicates that transmitting buffer 49 is in a state close to underflow state, it allows quantization step to be smaller to suppress underflow irrespective of comparison result between the allocated code quantity and code quantity generated. While it has been described that comparison between code quantity generated and allocated code quantity is made every macro block to switch quantization step size every macro block, such switch may be carried out every slice. While it has been described that code quantity generated is detected from storage quantity of transmitting buffer 49, it may be directly obtained from output of variable length encoding circuit 47. The quantization scale setting circuit 33 delivers quantization step size set in this way to quantizing circuit 46.

The quantizing circuit 46 quantizes coefficient data delivered from DCT circuit 45 by quantization step size delivered from the above-described quantization scale setting circuit 33 to generate quantized data.

VLC circuit 47 allows quantizing data delivered from quantizing circuit 46 to undergo variable length encoding along with quantization step size from quantization scale setting circuit 33, predictive mode from intra-frame/forward/backward/bidirectionally predictive judging circuit 13, and motion vector from motion vector detecting circuit 11, etc. to deliver variable length encoded data obtained to transmitting buffer memory 49 as a second bit stream.

Figure 3:
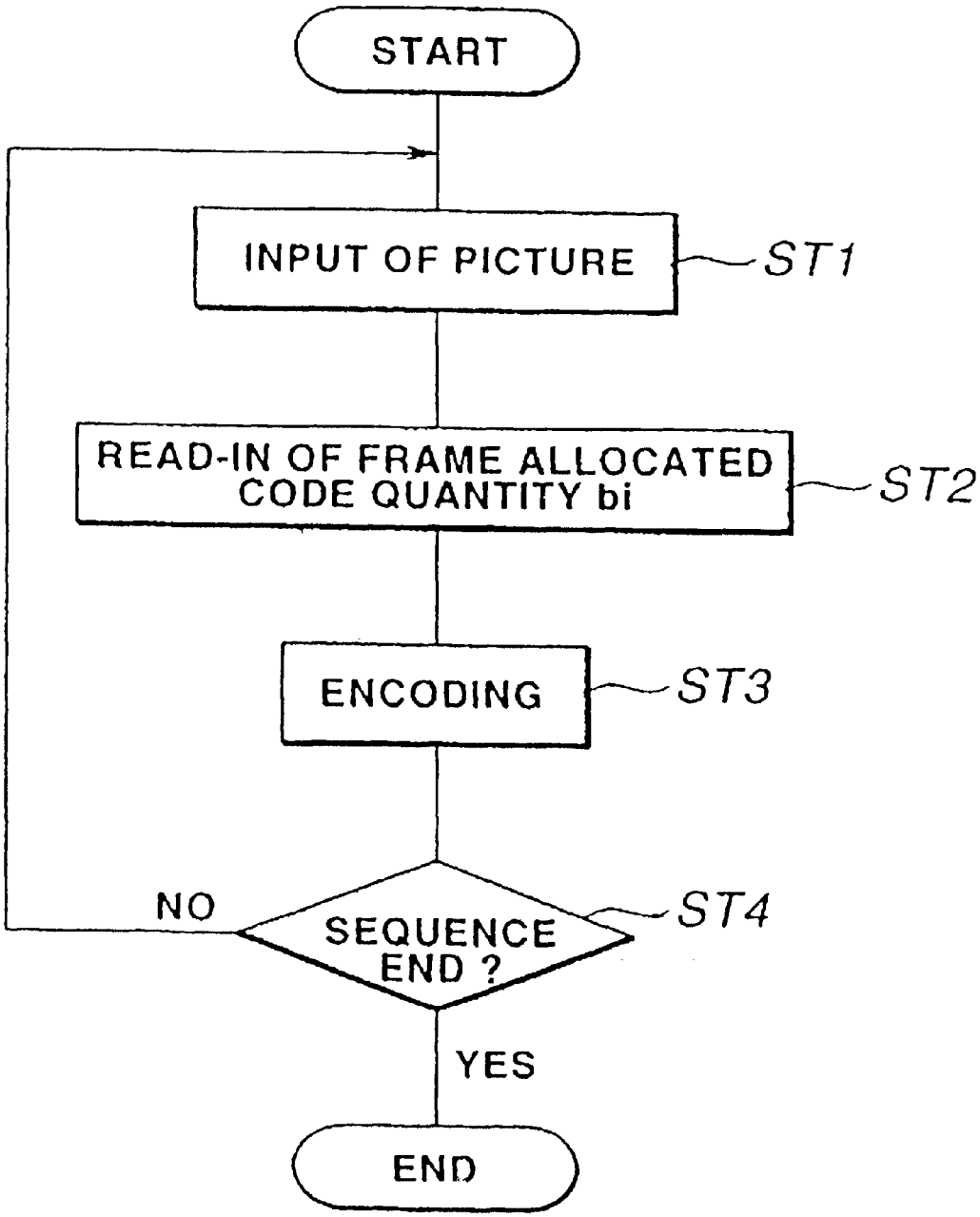
FIG. 3 is a flowchart for explaining the operation of second encoding circuit constituting the above-mentioned picture encoding apparatus.

Namely, in this picture encoding apparatus, as shown in FIG. 3, for example, when picture data is inputted through delay element 43 at step ST1, quantization scale setting circuit 33 reads in, from encoding control circuit 30, allocated code quantity with respect to frame to be currently encoded at step ST2, then, the processing operation proceeds to step ST3.

At step ST3, predictive encoding circuit 44~VLC circuit 47 implement predictive encoding processing and DCT processing to picture data, and quantizes coefficient data by quantization step size based on allocated code quantity thereafter to allow it to undergo variable length encoding. Then, the processing operation proceeds to step ST4.

At the step ST4, whether or not encoding processing has been completed with respect to all frames (sequence) to which, e.g., the same picture size or the same transfer rate is applied is judged. If so, the processing is completed. In contrast, if not so, the processing operation returns to step ST1. Thus, variable rate encoding such that encoding rate changes in frame units is realized. Accordingly, even if pictures (frames) of complicated pattern are successive, there is no possibility that quantization step size is caused to be large with respect to these pictures as in the conventional apparatus. Thus, uniform high picture quality can be obtained through the entirety.

The transmitting buffer memory 49 temporarily stores variable length encoded data thereafter to read out it at a fixed bit rate to thereby smooth the variable length encoded data to output it as bit stream. The bit stream which has been outputted from transmitting buffer 49 is multiplexed along with, e.g., encoded audio signal, synchronizing signal, etc. Further, code for error correction is added thereto, and a predetermined modulation suitable for transmission or recording is applied thereto. Thereafter, bit stream thus processed is transmitted to picture decoding apparatus through, e.g., transmission path, or is recorded onto picture recording medium 55 comprised of optical disc, magnetic disc or magnetic tape, etc. as shown in the FIG. 1 mentioned above. Namely, since, in the second encoding circuit 40, there is carried out a variable rate encoding such that, e.g., allocated code quantity $b_i$ is increased in advance with respect to complicated picture and allocated code quantity $b_i$ is decreased with respect to simple picture, there is no necessity of applying a fixed rate of high rate through the entirety in order to avoid extreme deterioration of picture quality with respect to pictures of complicated pattern as in the case of conventional apparatus. Thus, recording time of picture recording medium 55 can be prolonged.

On the other hand, inverse quantizing circuit 48 inverse-quantizes quantized data delivered from quantizing circuit 46 by quantization step size used in the above-described quantizing circuit 46 to reproduce coefficient data (quantization distortion is added) corresponding to output of DCT circuit 45 to deliver this coefficient data to IDCT circuit 50. Namely, inverse quantizing circuit 48~adding circuit 51 constituting a local decoding circuit locally decode quantized data outputted from quantizing circuit 46 to write decoded picture obtained into frame memory 52 as forward predictive picture or backward predictive picture. Picture data stored in frame memory 52 is used as predictive picture for picture to be processed next.

Meanwhile, while, in the above-described embodiment, allocated code quantity per predetermined time, i.e., mean encoding rate per predetermined time is obtained every frame with frame being used as predetermined time, this invention is not limited to such an implementation. For example, GOP (Group of Pictures in so called MPEG (Moving Picture Expert Group) may be used as a predetermined time. It should be noted that the above-described MPEG is general name of the moving picture encoding system being studied in WG (Working Group) 11 of SC (Sub Committee) 29 in JTC (Joint Technical Committee) of so called ISO (International Standardization Organization) and IEC (International Electrochemical Committee).

Namely, GOP in MPEG consists of at least one so called I picture, and a plurality of P pictures of B pictures (non-I picture). In a more practical sense, assuming that GOP consists of a single I picture, four P pictures having a period of 3 pictures, and ten B pictures, encoding control circuit 30 determines allocated code quantity every GOP. Here, I picture is picture to be subjected to intra-field or intra-frame encoding. P picture is picture which can be predicted only from forward direction, and is subjected to interfield or intra-frame encoding. B picture is picture which can be predicted from forward direction, from back ward direction and from both directions and is subjected to interfield or intra-frame encoding.

Figure 5:
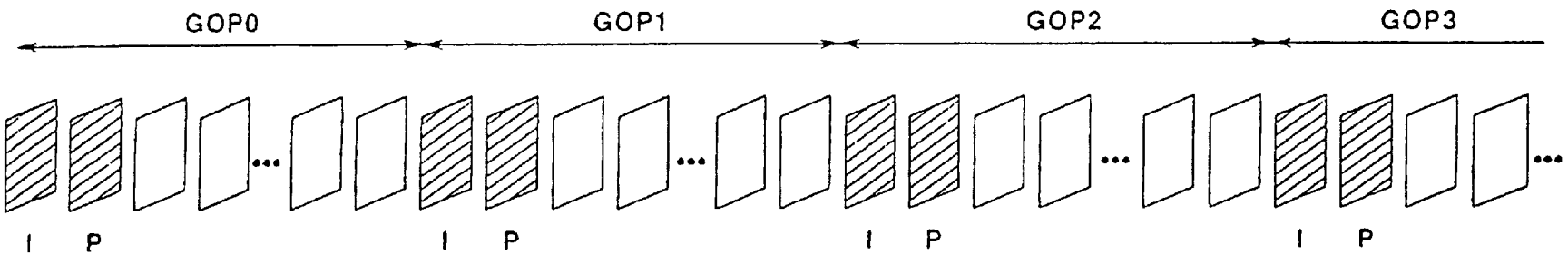
FIG. 5 is a view showing respective pictures for explaining encoding control signal every GOP.

When it is assumed, as shown in FIG. 5, for example, that successive arbitrary two pictures within GOP having the number of pictures consisting GOP as period are I picture and P picture, and quantization step size is, e.g., 1, the first encoding circuit 10 implements predictive encoding processing, DCT processing, and variable length encoding processing to picture data of these I and P pictures to generate variable length encoded data to deliver the variable length encoded data to encoding control circuit 30. The reason why two pictures are used as I picture, P picture is to examine complexity of pattern and correlation between frames. From code quantity generated of I picture, it is possible to recognize complexity of pattern. From code quantity generated of P picture, it is possible to recognize correlation between frames. Since successive plural frames have similar pictorial images in general, it is possible to recognize tendency of pattern of GOP even from extracted two pictures.

Encoding control circuit 30 counts (calculates), every GOP, data quantity of I picture bit $I_j$ and data quantity of P picture bit $P_j$, and determines, every GOP, difficulty (code quantity generated GOP $d_j$ (j=0, 1, 2 . . . ) on the basis of these data quantities bit $I_j$, bit $P_j$ and the number N of P pictures constituting GOP as indicated by the following formula (5), for example.

$$GOPd_i = bitI_j + N \times bitP_j \quad (5)$$

The encoding control circuit 30 determines allocated code quantity allocated every GOP on the basis of difficulty (code quantity generated) GOP $d_j$ every GOP and total quantity of usable data, and delivers this allocated code quantity to second encoding circuit 40.

In actual terms, when the number of GOPs is assumed to be M, total quantity of usable data is assumed to be B, allocated code quantity with respect to the j-th GOP is GOP $b_j$, and this allocated code quantity GOP $b_j$ is caused to be in proportion to difficulty as indicated by the following formula (6), data total quantity B is determined by adding allocated code quantities GOP $b_j$ of all GOPs as indicated by the following formula (7). In the formula (6), a is constant.

$$GOPb_j = a \times GOPd_j \quad (6)$$

$$B = \sum_{j=0}^{M-1} GOPb_j$$

Accordingly, constant a can be determined By the following formula (8). Substituting this constant a into the formula (6), $$B = \sum_{j=0}^{m-1} a \times GOPd_j = a \times \sum_{j=0}^{m-1} GOPd_j \quad (7)$$

allocated code quantity $GOPb_j$ with respect to the j-th GOP can be determined by the following formula (9).

$$a = \frac{B}{\sum_{j=0}^{M-1} GOPd_j} \quad (8)$$

$$GOPb_j = GOPd_j \times \left( \frac{B}{\sum_{i=0}^{N-1} GOPd_j} \right) \quad (9)$$

Thus, encoding control circuit 30 increases allocated code quantity GOP $b_j$ with respect to, e.g., GOP in which pictures of complicated pattern are included or having low correlation between frames, and decreases allocated code quantity GOP $b_j$ with respect to GOP in which pictures of simple pattern are included or having high correlation between frames.

Figure 6:
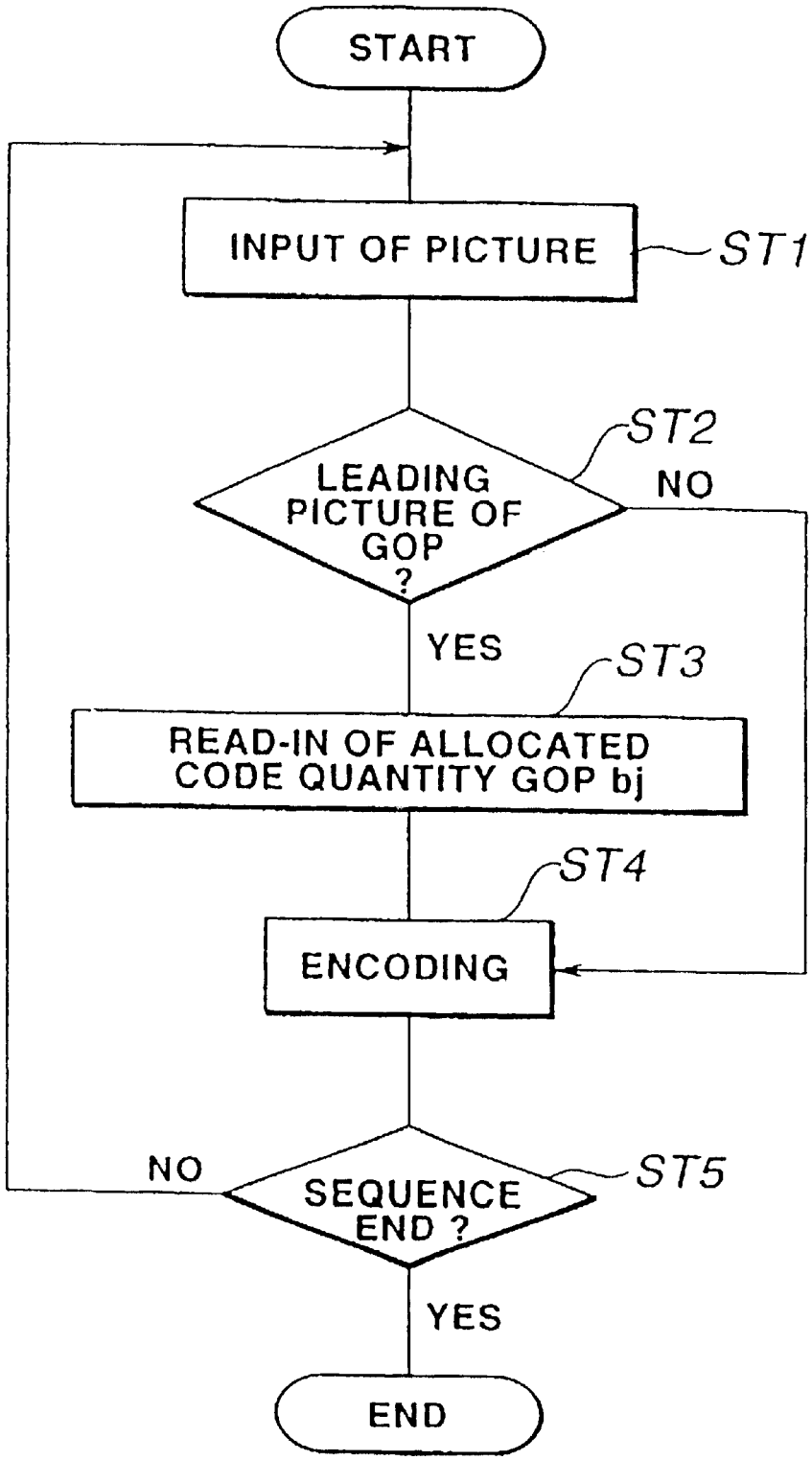
FIG. 6 is a flowchart for explaining the operation of the second encoding circuit constituting the above-mentioned picture encoding apparatus.
Figure 7:
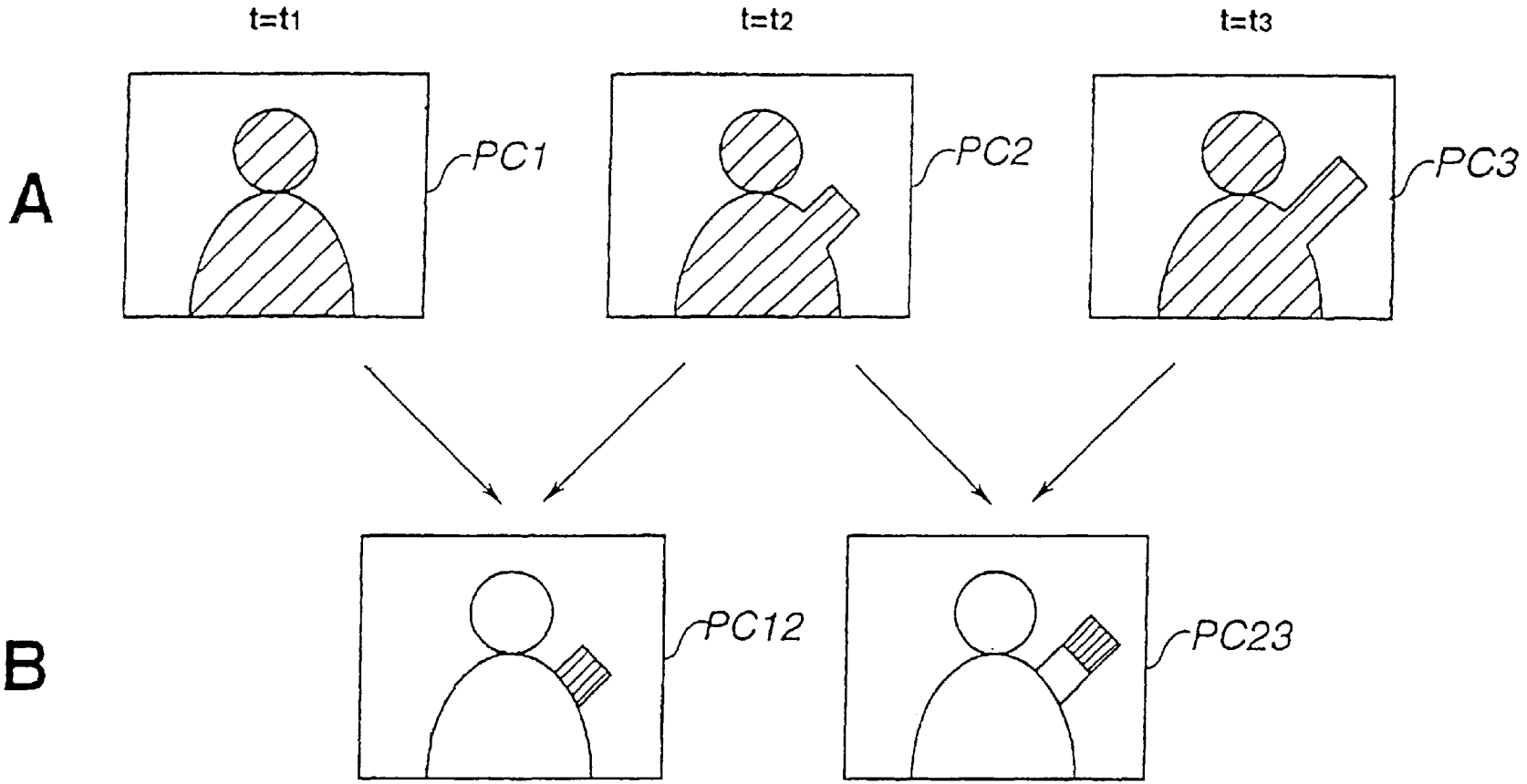
FIG. 7 is a view showing picture for explaining the principle of predictive encoding.
Figure 8:
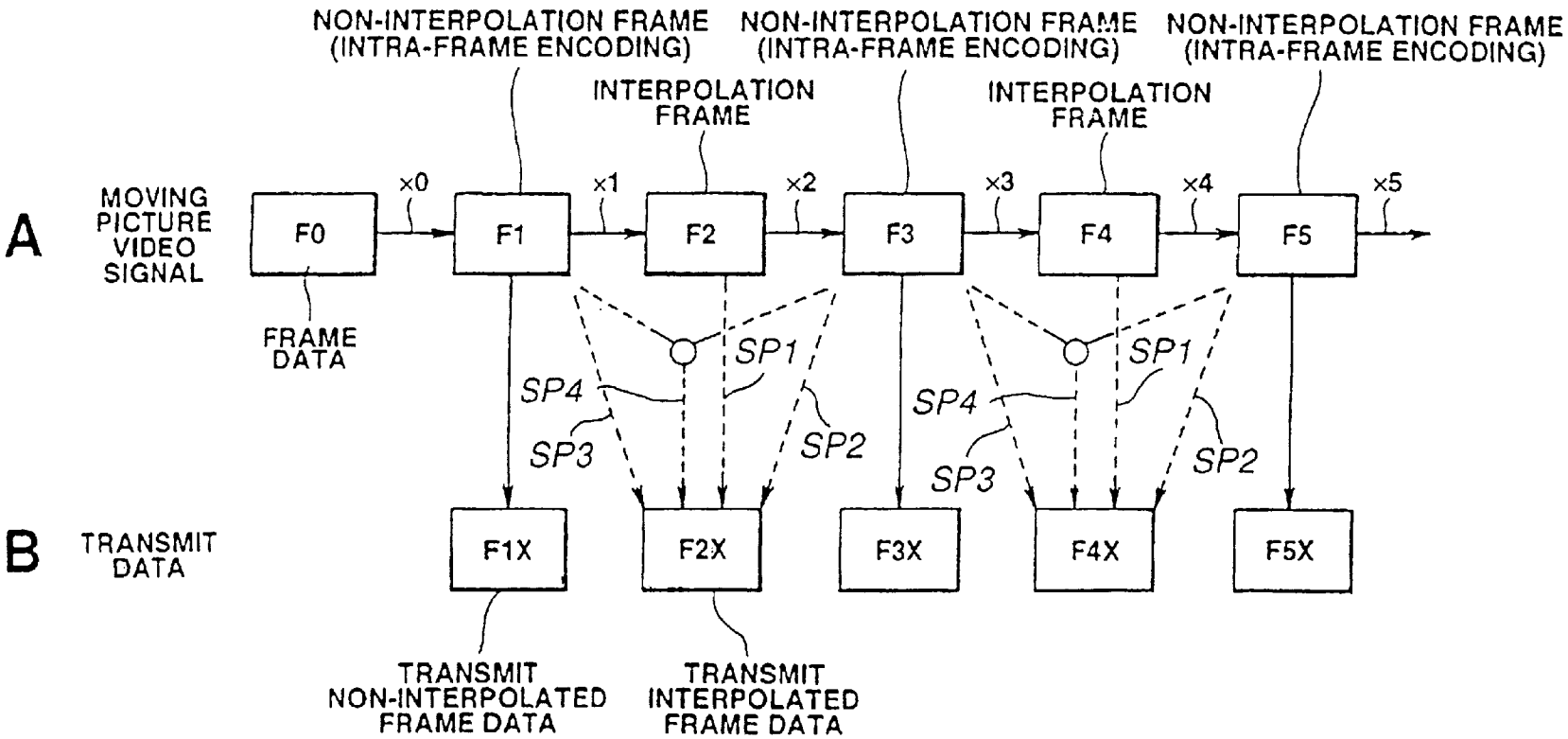
FIG. 8 is a view showing picture for explaining the principle of motion compensated predictive encoding.
Figure 9:
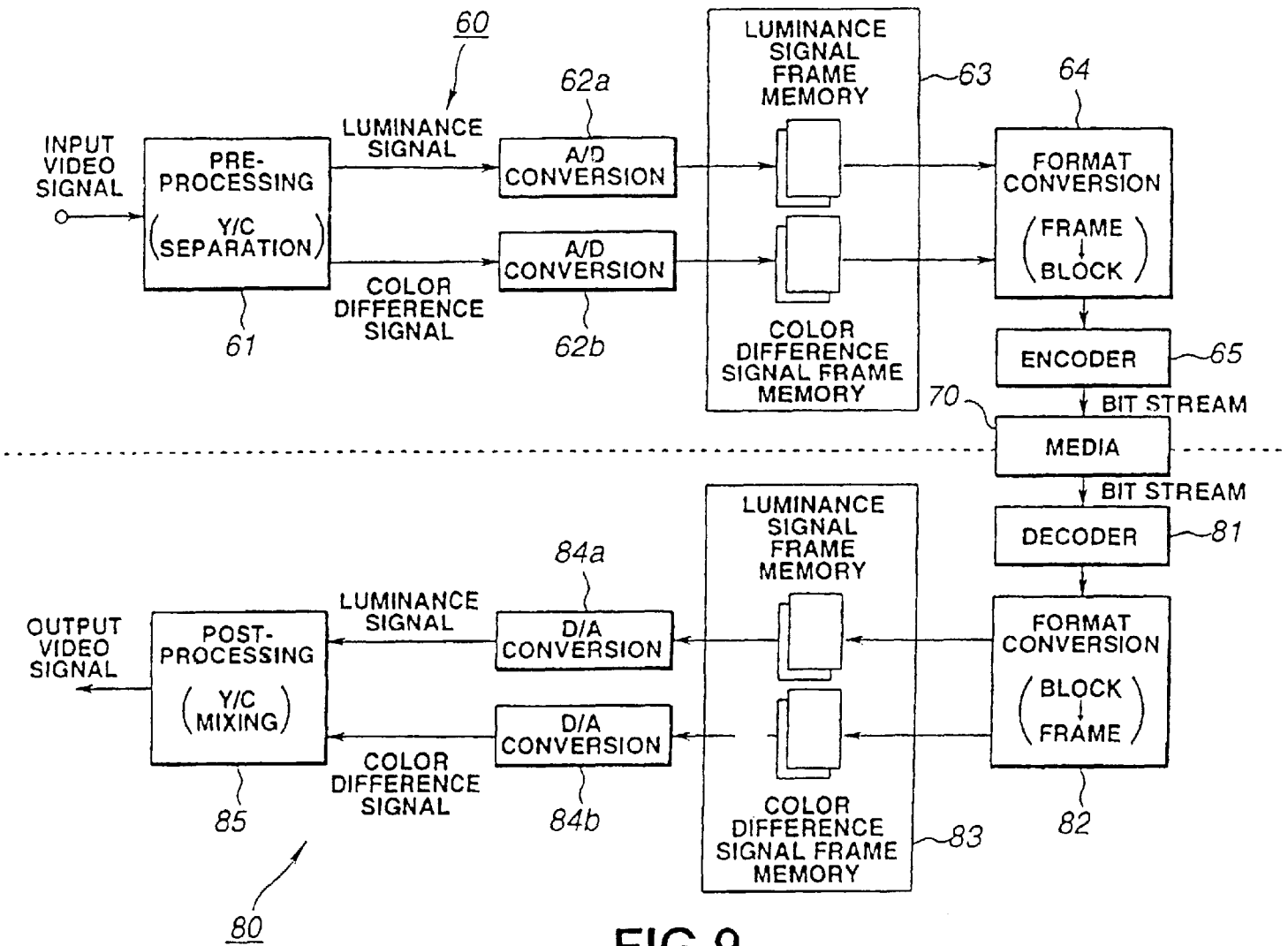
FIG. 9 is a block diagram showing the configuration of picture encoding apparatus (unit) and picture decoding apparatus (unit) which are related to this invention.
Figure 11:
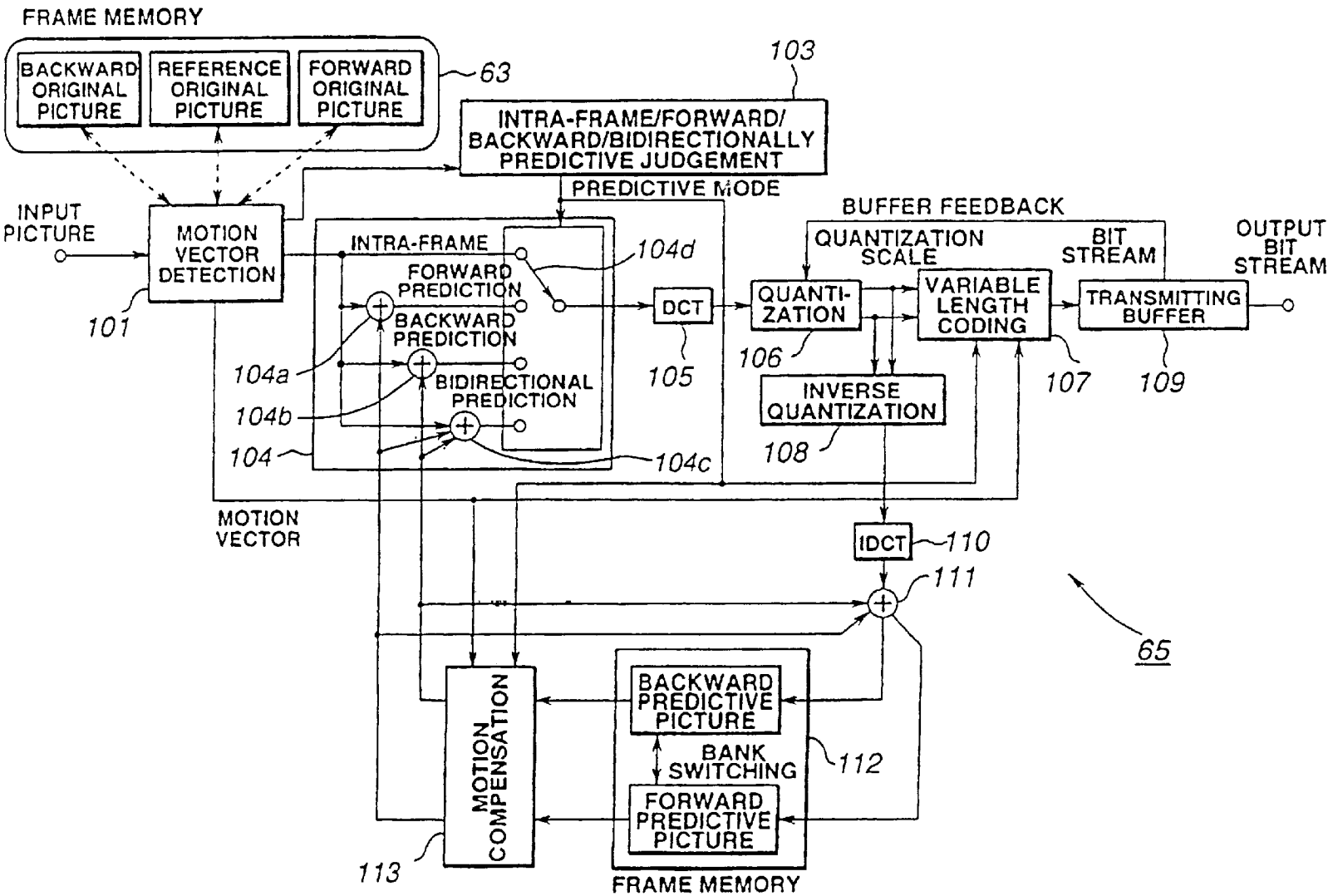
FIG. 11 is a block diagram showing a circuit configuration of conventional encoder.
Figure 12:
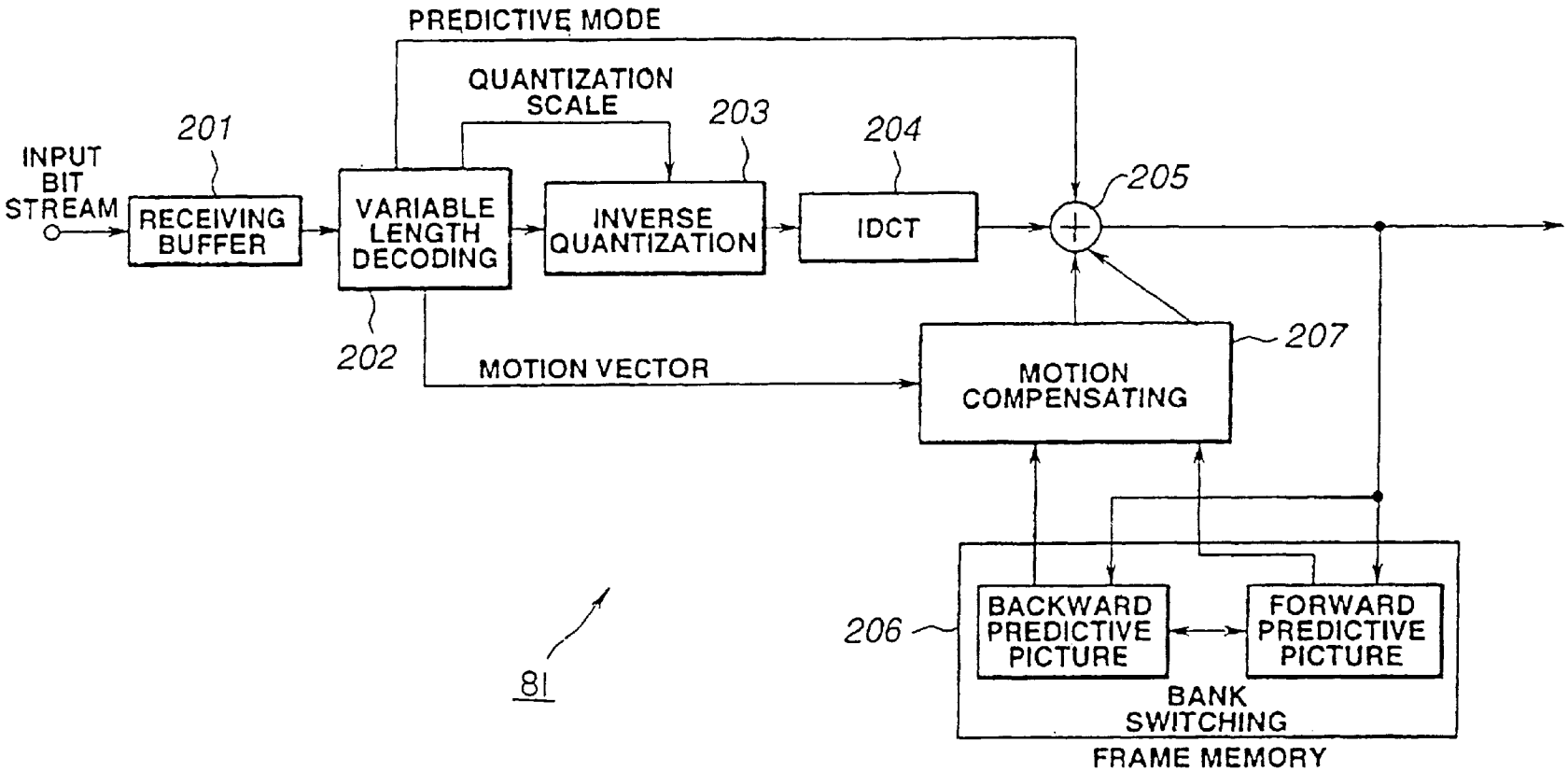
FIG. 12 is a block diagram showing a circuit configuration of conventional decoder.

When second encoding circuit 40 is supplied with picture data through delay element 43 at step ST1, as shown in FIG. 6, for example, it judges, at step ST2, whether or not picture data being inputted is the leading picture of GOP. If so, the processing operation proceeds to step ST3. If not so, the processing operation proceeds to step ST4.

At step ST3, second encoding circuit 40 reads in allocated code quantity with respect to GOP currently subjected to encoding from encoding control circuit 30. Then, the processing operation proceeds to step ST4.

At the step ST4, second encoding circuit 40 implements predictive encoding processing and DCT processing, and quantizes coefficient data by quantization step size based on allocated code quantity thereafter to allow it to undergo variable length encoding. Then, the processing operation proceeds to step ST5.

Figure 4:
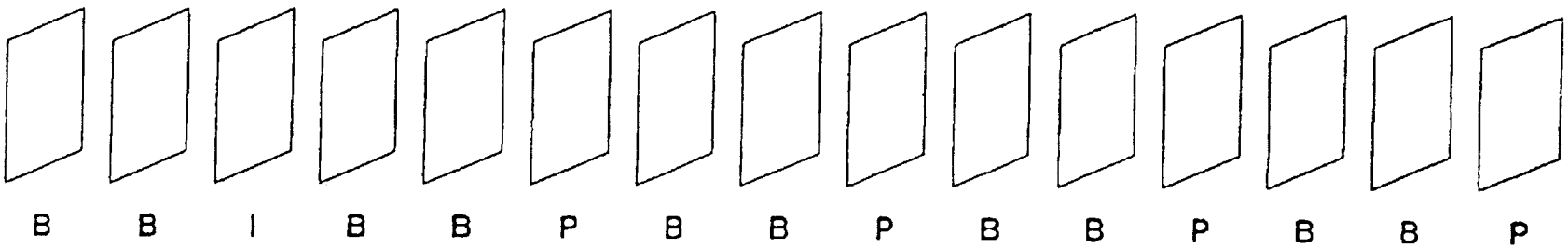
FIG. 4 is a view showing respective pictures for explaining the configuration of GOP in MPEG.

Here, quantization scale setting circuit 33 sets allocated code quantity every frame from delivered allocated code quantity every GOP by taking into consideration picture type (I picture, P picture, B picture) in actual encoding, e.g., picture type shown in FIG. 4. In a more practical sense, allocated code quantity with respect to I picture is increased, allocated code quantity with respect to B picture is decreased, and allocated code quantity with respect to P picture is caused to be intermediate therebetween.

At the subsequent step ST5, whether or not encoding processing has been completed with respect to all frames (sequence) to which the same picture size or the same transfer rate is applied is judged. If so, the processing is completed. In contrast, if not so, the processing operation returns to step ST1. Thus, a variable rate encoding such that encoding rate changes every GOP is realized. Even if pictures (frames) of complicated pattern are successive, there is no possibility that quantization step size is caused to be large with respect to these pictures as in the conventional apparatus. As a result, it is possible to obtain uniform high picture quality over the entirety. Further, since allocated code quantity every GOP is determined on the basis of two pictures in this embodiment, higher speed processing can be carried out as compared to the above-described embodiment. It is to be noted that it is a matter of course to determine allocated code quantities of respective GOPs on the basis of data quantities of all pictures within GOP.

It should be noted that this invention is not limited to the above-described embodiments. While, e.g., transform coding employs DCT in the above-described embodiments, so called Strato transform, Haar transform or Wavelet transform, etc. may be employed.

Industrial Applicability

As is clear from the foregoing description, this invention employs a scheme to allow an input video signal to undergo encoding, e.g., predictive encoding, DCT processing, quantization at fixed quantization step size and variable length encoding to generate first encoded data to determine (calculate) allocated code quantity every frame or every GOP on the basis of data quantity every predetermined time, e.g., every frame or every GOP of the first encoded data and total quantity of usable data to encode the input video signal every predetermined time on the basis of the allocated code quantity to generate second encoded data. Thus, variable rate encoding such that encoding rate changes every predetermined time is realized. As a result, even if pictures (frames) of complicated are successive, there is no possibility that quantization step size is caused to be large with respect to these pictures as in the conventional apparatus. Thus, uniform high picture quality can be obtained over the entirety.

Further, since second encoded data obtained in a manner as described above has variable rate, in the case where such encoded data is recorded onto picture recording media, limited memory capacity can be effectively used, and recording time of picture recording media can be prolonged. In addition, picture data of high picture quality uniform through the entirety can be reproduced from the picture recording media.

What is claimed is:

1. An encoding method, comprising the steps of:

receiving an input video signal;

selectively encoding at least a portion of said input video signal by intra-frame encoding or predictive encoding to generate first encoded data, said predictive encoding including forward predictive encoding and backward predictive encoding;

transform encoding said first encoded data to generate first coefficient data;

quantizing said first coefficient data by a fixed step size;

variable length encoding said first quantized data to generate a first bit stream;

determining an encoding rate of said first bit stream every GOP as a function of a data quantity of intra-frame and forward-predictive encoded pictures only in the GOP;

selectively encoding said input video signal by intra-frame or predictive encoding to generate second encoded data;

transform encoding said second encoded data to generate second coefficient data;

setting a variable step size according to the encoding rate determined every GOP;

quantizing said second coefficient data by said variable step size;

variable length encoding said second quantized data to generate a second bit stream; and outputting said second bit stream.

2. An encoding apparatus, comprising:

means for receiving an input video signal;

means for selectively encoding at least a portion of said input video signal by intra-frame encoding or predictive encoding to generate first encoded data, said predictive encoding including forward predictive encoding and backward predictive encoding;

means for transform encoding said first encoded data to generate first coefficient data;

means for quantizing said first coefficient data by a fixed step size;

means for variable length encoding said first quantized data to generate a first bit stream;

means for determining an encoding rate of said first bit stream every GOP as a function of a data quantity of intra-frame and forward-predictive encoded pictures only in the GOP;

means for selectively encoding said input video signal by intra-frame or predictive encoding to generate second encoded data;

means for transform encoding said second encoded data to generate second coefficient data;

means for setting a variable step size according to the encoding rate determined every GOP;

means for quantizing said second coefficient data by said variable step size;

means for variable length encoding said second quantized data to generate a second bit stream; and means for outputting said second bit stream.

3. A recording medium on which there is recorded a second bit stream obtained by:

receiving an input video signal;

selectively encoding at least a portion of said input video signal by intra-frame encoding or predictive encoding to generate first encoded data, said predictive encoding including forward predictive encoding and backward predictive encoding;

transform encoding said first encoded data to generate first coefficient data;

quantizing said first coefficient data by a fixed step size;

variable length encoding said first quantized data to generate a first bit stream;

determining an encoding rate of said first bit stream every GOP as a function of a data quantity of intra-frame and forward-predictive encoded pictures only in the GOP;

selectively encoding said input video signal by intra-frame or predictive encoding to generate second encoded data;

transform encoding said second encoded data to generate second coefficient data;

setting a variable step size according to the encoded data rate determined every GOP;

quantizing said second coefficient data by said variable step size;

variable length encoding said second quantized data to generate a second bit stream; and recording said second bit stream on said recording medium.

4. An encoding method, comprising the steps of:

receiving an input video signal;

selectively encoding at least a portion of said input video signal by inter-frame encoding or predictive encoding to generate first encoded data, said predictive encoding including forward predictive encoding and backward predictive encoding;

transform encoding said first encoded data to generate first coefficient data;

quantizing said first coefficient data by a fixed step size;

variable length encoding said first quantized data to generate a first bit stream;

determining a difficulty of encoding said first bit stream every GOP based on inter-frame and forward-predictive encoded pictures only in the GOP;

calculating an encoding rate frame said difficulty of encoding determined every GOP;

selectively encoding said input video signal by intra-frame or predictive encoding to generate second encoded data;

transform encoding said second encoded data to generate second coefficient data;

quantizing the second coefficient data by a step size set according to said calculated encoding rate;

variable length encoding said second quantized data to generate a second bit stream; and outputting said second bit stream.

5. An encoding apparatus, comprising:

means for receiving an input video signal;

means for selectively encoding at least a portion of said input video signal by intra-frame encoding or predictive encoding to generate first encoded data, said predictive encoding including forward predictive encoding and backward predictive encoding;

means for transform encoding said first encoded data to generate first coefficient data;

means for quantizing said first coefficient data by a fixed step size;

means for variable length encoding said first quantized data to generate a first bit stream;

means for determining a difficulty of encoding said first bit stream every GOP based on intra-frame and forward-predictive encoded pictures only in the GOP;

means for calculating an encoding rate from said difficulty of encoding determined every GOP;

means for selectively encoding said input video signal by intra-frame or predictive encoding to generate second encoded data;

means for transform encoding said second encoded data to generate second coefficient data;

means for quantizing the second coefficient data by a step size set according to said calculated encoding rate;

means for variable length encoding said second quantized data to generate a second bit stream; and means for outputting said second bit stream.

6. A recording medium on which there is recorded a second bit stream obtained by:

receiving an input video signal;

selectively encoding at least a portion of said input video signal by intra-frame encoding or predictive encoding to generate first encoded data, said predictive encoding including forward predictive encoding and backward predictive encoding;

transform encoding said first encoded data to generate first coefficient data;

quantizing said first coefficient data by a fixed step size;

variable length encoding said first quantized data to generate a first bit stream;

determining a difficulty of encoding said first bit stream every GOP based on intra-frame and forward-predictive encoded pictures only in the GOP;

calculating an encoding rate from said difficulty of encoding determined every GOP;

selectively encoding said input video signal by intra-frame or predictive encoding to generate second encoded data;

transform encoding said second encoded data to generate second coefficient data;

quantizing the second coefficient data by a step size set according to said calculated encoding rate;

variable length encoding said second quantized data to generate a second bit stream; and recording said second bit stream on said recording medium.

7. An encoding method, comprising the steps of:

receiving an input video signal;

selectively encoding at least a portion of said input video signal by intra-frame or predictive encoding to generate first encoded data representing intra-frame or predictive encoded pictures, respectively;

transform encoding said first encoded data to generate first coefficient data;

quantizing said first coefficient data by a fixed step size;

variable length encoding said first quantized data to generate a first bit stream;

counting a data quantity of said first bit stream every predetermined time to indicate a difficulty of encoding;

determining said difficulty of encoding said first bit stream based on intra-frame and forward-predictive encoded pictures only;

calculating an allocated code quantity for each unit of predetermined time as a function of said difficulty of encoding so that said allocated code quantity is set to be larger for complex pictures and smaller for simple pictures;

selectively encoding said input video signal by intra-frame or predictive encoding to generate second encoded data;

transform encoding said second encoded data to generate second coefficient data;

quantizing said second coefficient data at a step size set in response to said allocated code quantity;

variable length encoding said second quantized data to generate a second bit stream; and outputting said second bit stream.

8. A method according to claim 7, wherein the fixed quantization step size equals one.

9. A method according to claim 7, further comprising the step of storing said second bit stream in a buffer before it is output, wherein said quantization step size is further based on a quantity of said second bit stream stored in said buffer.

10. A method according to claim 7, wherein said predetermined time is a frame.

11. An encoding apparatus, comprising:

means for receiving an input video signal;

means for selectively encoding at least a portion of said input video signal by intra-frame or predictive encoding to generate first encoded data representing intra-frame or predictive encoded pictures, respectively;

means for transform encoding said first encoded data to generate first coefficient data;

means for quantizing said first coefficient data by a fixed step size;

means for variable length encoding said first quantized data to generate a first bit stream;

means for counting a data quantity of said first bit stream every predetermined time to indicate a difficulty of encoding;

means for determining said difficulty of encoding said first bit stream based on intra-frame and forward-predictive encoded pictures only;

means for calculating an allocated code quantity for each unit of predetermined time as a function of said difficulty of encoding so that said allocated code quantity is set to be larger for complicated pictures and smaller for simple pictures;

means for selectively encoding said input video signal by intra-frame or predictive encoding to generate second encoded data;

means for transform encoding said second encoded data to generate second coefficient data;

means for quantizing said second coefficient data at a step size set in response to said allocated code quantity;

means for variable length encoding said second quantized data to generate a second bit stream; and means for outputting said second bit stream.

12. An apparatus according to claim 11, wherein the fixed quantization step size equals one.

13. An apparatus according to claim 11, further comprising a buffer for storing said second bit stream before it is output, wherein said quantization step size is further based on a quantity of said second bit stream stored in said buffer.

14. An apparatus according to claim 11, wherein said predetermined time is a frame.

15. A recording medium on which there is recorded a second bit stream obtained by:

receiving an input video signal;

selectively encoding at least a portion of said input video signal by intra-frame or predictive encoding to generate first encoded data representing intra-frame or predictive encoded pictures, respectively;

transform encoding said first encoded data to generate first coefficient data;

quantizing said first coefficient data by a fixed step size;

variable length encoding said first quantized data to generate a first bit stream;

counting a data quantity of said first bit stream every predetermined time to indicate a difficulty of encoding;

determining said difficulty of encoding said first bit stream based on intra-frame and forward-predictive encoded pictures only;

calculating an allocated code quantity for each unit of predetermined time as a function of said difficulty of encoding so that said allocated code quantity is set to be larger for complicated pictures and smaller for simple pictures;

selectively encoding said input video signal by intra-frame or predictive encoding to generate second encoded data;

transform encoding said second encoded data to generate second coefficient data;

quantizing said second coefficient data at a step size set in response to said allocated code quantity;

variable length encoding said second quantized data to generate a second bit stream; and recording said second bit stream on said recording medium.

*16. An encoding method for encoding source video data, the method comprises the steps of:*

*encoding said source video data with a predetermined quantization step size to generate first encoded data;*

*detecting a difficulty of the encoding process of source video data based on bit amount of said first encoded data;*

*deciding an optimum quantization step size, said optimum quantization step size being varied depending on said difficulty so that said optimum quantization step size becomes smaller when said source video data is more complex and said optimum quantization step size becomes larger when source video data to be encoded is more simple; and*

*encoding said source video data by using said optimum quantization step on encoding unit basis,*

*wherein the predetermined quantization step size has a fixed value and the optimum quantization step size has a non-fixed value,*

*wherein said source video data is always encoded using said predetermined quantization step and said optimum quantization step in which the predetermined quantization step size is always different from the optimum quantization step size.*

*17. An encoding method for encoding source video data, the method comprises the steps of:*

*encoding said source video data with a predetermined quantization step size to generate first encoded data;*

*detecting a difficulty of the encoding process of source video data based on bit amount of said first encoded data;*

*calculating an allocated code quantity which is varied depending on said difficulty so that said allocated code quantity is more increased when said source video data is more complex and said allocated code quantity is more decreased when source video data is more simple; and*

*encoding said source video data by an optimum quantization step size based on said allocated code quantity,*

*wherein the optimum quantization step size has a non-fixed value, and*

*wherein said source video data is always encoded using said predetermined quantization step and said optimum quantization step in which the predetermined quantization step size is always different from the optimum quantization step size.*

*18. An encoding method for encoding source video data, the method comprises the steps of:*

*detecting motion vector of a macro block of said source video data;*

*encoding said macro block of said source video data by using a predetermined quantization step size and said detected motion vector to generate first encoded data;*

*detecting a difficulty of the encoding process of source video data based on amount of said first encoded data;*

*deciding an optimum quantization step size, said optimum quantization step size being varied depending on said difficulty so that said optimum quantization step size becomes smaller when said source video data is more complex and said optimum quantization step size becomes larger when source video data be encoded is more simple; and*

*encoding said macro block of said source video data by using said optimum quantization step and said detected motion vector,*

*wherein the predetermined quantization step size has a fixed value and the optimum quantization step size has a non-fixed value, and*

*wherein said source video data is always encoded using said predetermined quantization step and said optimum quantization step in which the predetermined quantization step size is always different from the optimum quantization step size.*

*19. An encoding method for encoding source video data, the method comprises the steps of:*

*selecting a predictive mode of a macro block of said source video data;*

*encoding said macro block of said source video data by using a predetermined quantization step size and said selected predictive mode to generate first encoded data;*

*detecting a difficulty of the encoding process of source video data based on amount of said first encoded data;*

*deciding an optimum quantization step size, said optimum quantization step size being varied depending on said difficulty so that said optimum quantization step size becomes smaller when said source video data is more complex and said optimum quantization step size becomes larger when source video data to be encoded is more simple; and*

*encoding said macro block of said source video data by using sad optimum quantization step and said selected predictive mode,*

*wherein the predetermined quantization step size has a fixed value and the optimum quantization step size has a non-fixed value, and*

*wherein said source video data is always encoded using said predetermined quantization step and said optimum quantization step in which the predetermined quantization step size is always different from the optimum quantization step size.*

*20. An encoding apparatus for encoding source video data, the apparatus comprising:*

*means for detecting motion vector of a macro block of said source video data;*

*first encoding means for encoding said macro block of said source video data by using a predetermined quan-*

*tization step size and said detected motion vector to generate first encoded data;*

*means for detecting a difficulty of the encoding process of source video data based on amount of said first encoded data;*

*means for deciding an optimum quantization step size, said optimum quantization step size being varied depending on said difficulty so that said optimum quantization step size becomes smaller when said source video data is more complex and said optimum quantization step size becomes larger when source video data to be encoded is more simple; and*

*second encoding means for encoding said macro block of said source video data by using said optimum quantization step and said detected motion vector,*

*wherein the predetermined quantization step size has a fixed value and the optimum quantization step size has a non-fixed value, and*

*wherein said source video data is always encoded using said predetermined quantization step and said optimum quantization step in which the predetermined quantization step size is always different from the optimum quantization step size.*

*21. An encoding apparatus for encoding source video data, the apparatus comprising:*

*means for selecting a predictive mode of a macro block of said source video data;*

*first encoding means for encoding said macro block of said source video data by using a predetermined quantization step size and said selected predictive mode to generate first encoded data;*

*means for detecting a difficulty of the encoding process of source video data based on amount of said first encoded data;*

*means for deciding an optimum quantization step size, said optimum quantization step size being varied depending on said difficulty so that said optimum quantization step size becomes smaller when said source video data is more complex and said optimum quantization step size becomes larger when source video data to be encoded is more simple; and*

*second encoding means for encoding said macro block of said source video data by using said optimum quantization step and said selected predictive mode,*

*wherein the predetermined quantization step size has a fixed value and the optimum quantization step size has a non-fixed value, and*

*wherein said source video data is always encoded using said predetermined quantization step and said optimum quantization step in which the predetermined quantization step size is always different from the optimum quantization step size.*

*22. An encoding apparatus for encoding source video data, the apparatus comprising:*

*first encoding means for encoding said source video data with a predetermined quantization step size to generate first encoded data;*

*second encoding means for encoding said source video data based on supplied quantization step size to generate second encoded data;*

*transmitting buffer for buffering said second encoded data; and*

*control means for detecting a difficulty of the encoding process in said first encoding means, and for deciding said quantization step size, said optimum quantization step size being varied depending on said difficulty so that said quantization step size becomes smaller when said source video data is more complex and said quantization step size becomes larger when source video data to be encoded is more simple, and said quantization step size being dependent on a remaining capacity of said transmitting buffer so as to suppress overflow and underflow in said transmitting buffer,*

*wherein the predetermined quantization step size has a fixed value and the optimum quantization step size has a non-fixed value, and*

*wherein said source video data is always encoded using said predetermined quantization step and said optimum quantization step in which the predetermined quantization step size is always different from the optimum quantization step size.*

* * * * *